US009555904B2

(12) United States Patent
Abrams et al.

(10) Patent No.: US 9,555,904 B2
(45) Date of Patent: Jan. 31, 2017

(54) GOSSAMER APPARATUS AND SYSTEMS FOR USE WITH SPACECRAFT

(71) Applicant: Analytical Mechanics Associates, Inc., Hampton, VA (US)

(72) Inventors: John Luther Abrams, Englewood, CO (US); Matthew Ernest Duchek, Boulder, CO (US)

(73) Assignee: ANALYTICAL MECHANICS ASSOCIATES, INC., Hampton, VA (US)

(*) Notice: Subject to any disclaimer, the term of this patent is extended or adjusted under 35 U.S.C. 154(b) by 245 days.

(21) Appl. No.: 13/963,761

(22) Filed: Aug. 9, 2013

(65) Prior Publication Data

US 2014/0042275 A1 Feb. 13, 2014

Related U.S. Application Data

(60) Provisional application No. 61/681,499, filed on Aug. 9, 2012.

(51) Int. Cl.
| | |
|---|---|
| *B64G 1/22* | (2006.01) |
| *B64G 1/24* | (2006.01) |
| *B64G 1/40* | (2006.01) |
| *B64G 1/64* | (2006.01) |

(52) U.S. Cl.
CPC ............... *B64G 1/222* (2013.01); *B64G 1/242* (2013.01); *B64G 1/407* (2013.01); *B64G 1/641* (2013.01)

(58) Field of Classification Search
CPC ........... B64G 1/22; B64G 1/222; B64G 1/242; B64G 1/62
See application file for complete search history.

(56) References Cited

U.S. PATENT DOCUMENTS

| | | | | |
|---|---|---|---|---|
| 3,521,290 A | * | 7/1970 | Hossein et al. | 343/915 |
| 3,809,337 A | * | 5/1974 | Andrews et al. | 244/172.7 |
| 3,848,821 A | | 11/1974 | Scheel | |
| 4,030,102 A | | 6/1977 | Kaplan et al. | |
| 6,017,002 A | * | 1/2000 | Burke et al. | 244/172.8 |

(Continued)

FOREIGN PATENT DOCUMENTS

| | | | | |
|---|---|---|---|---|
| EP | 0399055 A1 | * | 11/1990 | B64G 1/105 |
| FR | 2836451 A1 | * | 8/2003 | B64G 1/64 |

OTHER PUBLICATIONS

Alhorn, "NASA Chat: First Solar Sail Deploys in Low-Earth Orbit," Jan. 27, 2011 [retrieved on Mar. 2, 2011]. Retrieved from the Internet: <URL:http://www.nasa.gov/connect/chat/nanosail_chat2.html>; 9 pgs.

(Continued)

*Primary Examiner* — Tien Dinh
*Assistant Examiner* — Christopher Hutchens
(74) *Attorney, Agent, or Firm* — Mueting, Raasch & Gebhardt, P.A.

(57) ABSTRACT

Gossamer apparatus and systems for use with spacecraft may include a deployable gossamer apparatus. The deployable gossamer apparatus may include a plurality rib members and gossamer material extending therebetween and may be configured in a stowed configuration and a deployed configuration. The rib members of the deployable gossamer apparatus store potential energy used for deployment of the deployable gossamer apparatus.

16 Claims, 30 Drawing Sheets

(56) References Cited

U.S. PATENT DOCUMENTS

| | | | |
|---|---|---|---|
| 6,286,787 | B1 | 9/2001 | Fleeter |
| 6,550,720 | B2 | 4/2003 | Fleeter et al. |
| 6,843,029 | B2 | 1/2005 | Breitbach et al. |
| 7,104,506 | B1 * | 9/2006 | Goodzeit et al. ............. 244/168 |
| 7,895,795 | B1 | 3/2011 | Murphey et al. |
| 8,167,247 | B2 * | 5/2012 | Daily et al. ................. 244/172.6 |
| 8,292,232 | B1 * | 10/2012 | Andrews et al. .......... 244/159.1 |
| 8,356,774 | B1 * | 1/2013 | Banik et al. ............... 244/159.5 |
| 8,636,253 | B1 * | 1/2014 | Spence et al. ............. 244/172.8 |
| 8,876,062 | B1 * | 11/2014 | Baghdasarian ............ 244/172.6 |
| 2009/0002257 | A1 * | 1/2009 | de Jong et al. ............... 343/872 |
| 2009/0218448 | A1 | 9/2009 | Peypoudat et al. |
| 2010/0215424 | A1 * | 8/2010 | Crookston et al. .............. 403/6 |
| 2014/0263844 | A1 * | 9/2014 | Cook et al. .................. 244/164 |

OTHER PUBLICATIONS

Aziz et al. "Universal Small Payload Interface—An Assessment of US Piggyback Launch Capability," 14$^{th}$ Annual AIAA/USU Conference on Small Satellites, Aug. 2000 [retrieved on Feb. 12, 2015]. Retrieved from the Internet: URL:http://digitalcommons.usu.edu/cgi/viewcontent.cgi?article=2106&context=smalsmal>; 13 pgs.

Biddy, "LightSail-1$^{TM}$ Solar Sail Design and Qualification," 41$^{st}$ Aerospace Mechanism Symposium, May 16-18, 2012, Pasadena, CA. Available on the Internet: <URL:http://www.planetary.org/explore/projects/lightsail-solar-sailing/Aerospace-Mechanisms-Symposium_Chris-Biddy.pdf>; 17 pgs.

Clark, "Solar Sail Demo Packed up to Prove New Technologies," Spaceflight Now, Nov. 16, 2010 [retrieved on Feb. 12, 2015]. Retrieved from the Internet: <URL:http://www.spaceflightnow.com/minotaur/stps26/101116nanosail/>; 5 pgs.

Davis and Tanimoto, "Chapter 8—Mechanical Development of Antenna Systems," *Spaceborne Antennas for Planetary Exploration*, 2006, ed. Imbriale, John Wiley & Sons, Inc., Hoboken, NJ, USA; pp. 425-454. Published online Apr. 10, 2006.

Dupuy and Le Couls, "Gossamer Technology to Deorbit LEO Non-Propulsion Fitted Satellite," Proceedings of the 40$^{th}$ Aerospace Mechanisms Symposium, May 12, 2010, pp. 301-308.

"End-Of-Life De-Orbit Strategies, Executive Summary," 2002. Doc. No. EOL-OHB-ES-001. Retrieved from the Internet: <URL:https://www.yumpu.com/en/document/view/7937460/executive-summary-end-of-life-de-orbit-strategies-esa>; 19 pgs.

Gloyer and Goldstein, "Small Payload Orbit Transfer (SPORT™) System: An Innovative Approach to Lowering Missions Costs Without Increased Risk," 2000 [retrieved on Feb. 19, 2015], *Proceedings of the AIAA/USU Conference on Small Satellites*, Technical Session IV, Paper No. SSC00-IV-6. Retrieved from the Internet: <URL:http://digitalcommons.usu.edu/cgi/viewcontent.cgi?article=2063&context=smallsat>; 8 pgs.

Gloyer et al., "Small Payload Orbit Transfer (SPORT™) System: Lowering Launch Cost Without Increased Risk," Aerospace Conference, Mar. 10-17, 2001, Big Sky, MT, *IEEE Proceedings*, 2001, 5:2555-2561.

Gloyer et al., "Aerobraking Technology for Earth Orbit Transfers," 16$^{th}$ Annual USU Conference on Small Satellites, Logan, Utah, Aug. 2002, *Proceedings of the AIAA/USU Conference on Small Satellites*, SSC02-VII-2. Retrieved from the Internet: <URL:http://digitalcommons.usu.edu/cgi/viewcontent.cgi?article=1932&context=smallsat>; 18 pgs.

Harkness, "An Aerostable Drag-sail Device for the Deorbit and Disposal of Sub-Tonne, Low Earth Orbit Spacecraft," Ph.D. Thesis, Oct. 2006, Cranfield University School of Engineering, Bedfordshire, United Kingdom. Available on the Internet: <URL:https://dspace.lib.cranfield.ac.uk/bitstream/1826/1623/1/Print_Main.pdf>; 215 pgs.

Montgomery IV and Adams, "NanoSail-D," 2008 CubeSat Developers Workshop, San Luis Obispo, CA, Apr. 11, 2008. Available on the Internet: <URL:http://ntrs.nasa.gov/archive/nasa/casi.ntrs.nasa.gov/20080023323.pdf>; 19 pgs.

NanoSail-D, Wikipedia, the free encyclopedia, last modified Feb. 24, 2011 [retrieved on Mar. 2, 2011]. Retrieved from the Internet: <URL:http//:en.wikipedia.org/wiki/NanoSail-D>; 2 pgs.

Nobuaki and Yasuyuki, "A Proposal of Deployable Membrane Structure for De-Orbit of Nano Satellite," *Nihon Kikai Gakkai Nenji Taikai Koen Ronbunshu*, 2006, vol. 5, pp. 333-334. Abstract only, 1 page.

"On-Orbit Demonstration of Gossamer Structure," Nakamura & Miyazaki Laboratory, Jun. 1, 2007 [retrieved on Mar. 2, 2011]. Retrieved from the Internet: <URL:http://forth.aero.cst.nihon-u.ac.jp/activity/e-smallsat.html>; 1 page.

Seffen et al., "Folding and Deployment of Curved Tape Springs," *International Journal of Mechanical Sciences*, 2000, 42:2055-2073.

"University of Glasgow and Clyde Space Set to put Brakes on Spacejunk Problem," 2015, [retrieved on Feb. 12, 2015]. Retrieved from the Internet: <URL:http://www.clyde-space.com/video/lets_put_brakes_spacejunk_problem>; 1 page.

"University of Surrey has Developed a Nanosatellite Cubesail Solar Sail to Clear Orbital Junk," *Next Big Future*, Mar. 30, 2010 [retrieved on Jan. 6, 2015]. Retrieved from the Internet: <URL:http://nextbigfuture.com/2010/03/university-of-surrey-as-developed.html>; 3 pages.

"University of Surrey . . . Space Sailing for Debris Deorbiting . . . " *Satnews Daily*, Mar. 28, 2010 [retrieved on Jan. 6, 2015]. Retrieved from the Internet: <URL:http://www.satnews.com/story.php?number=1924683454>; 2 pages.

* cited by examiner

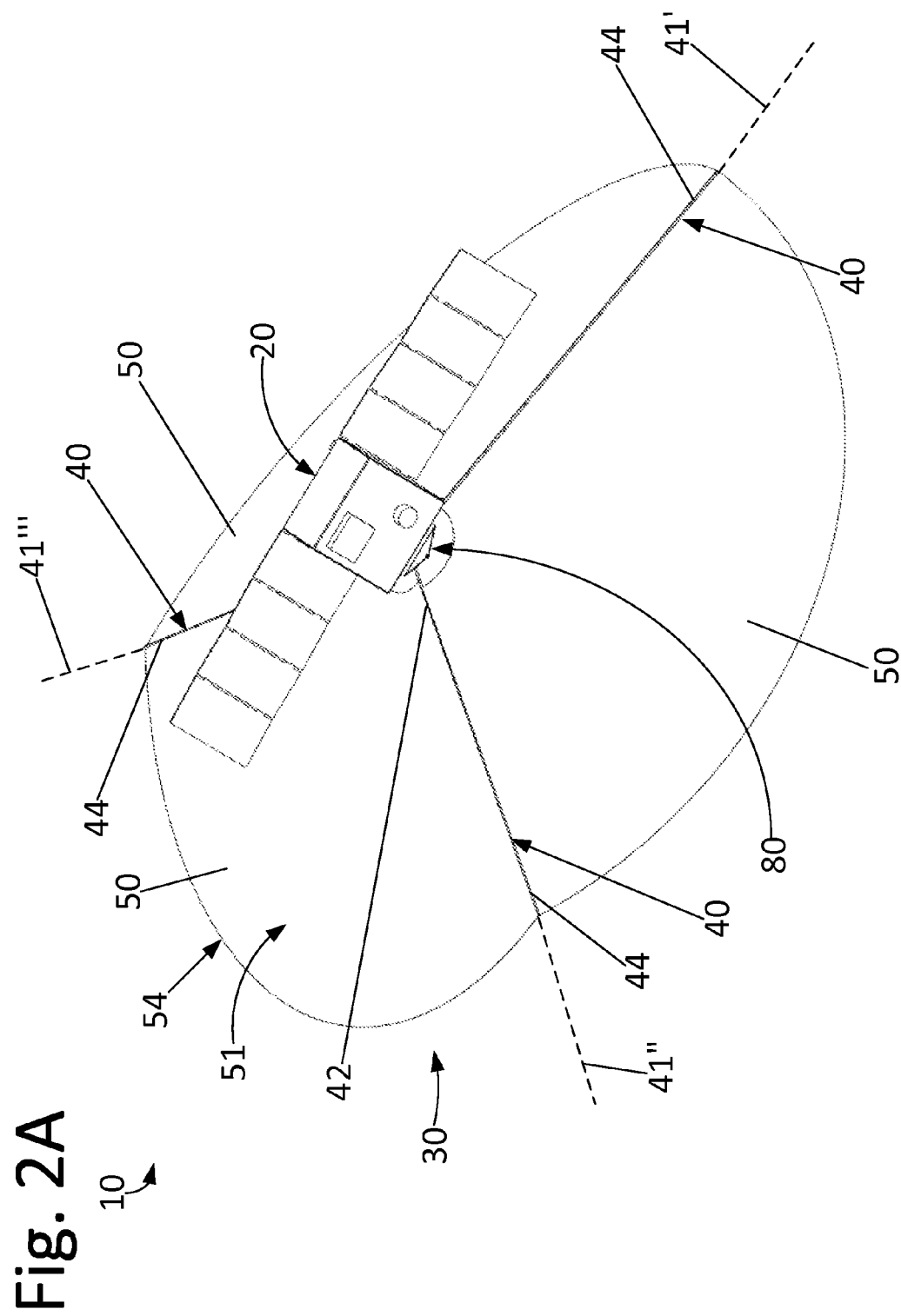

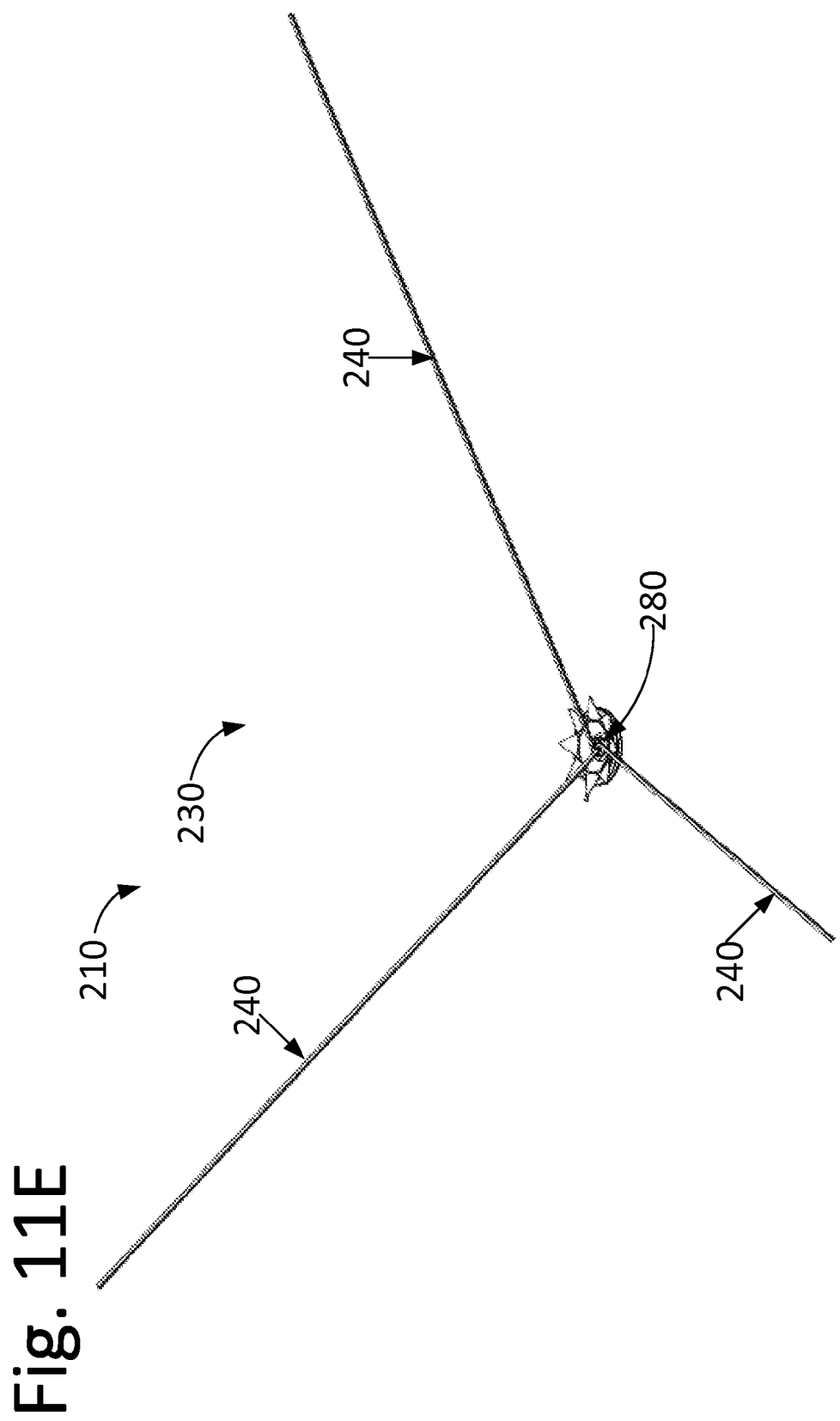

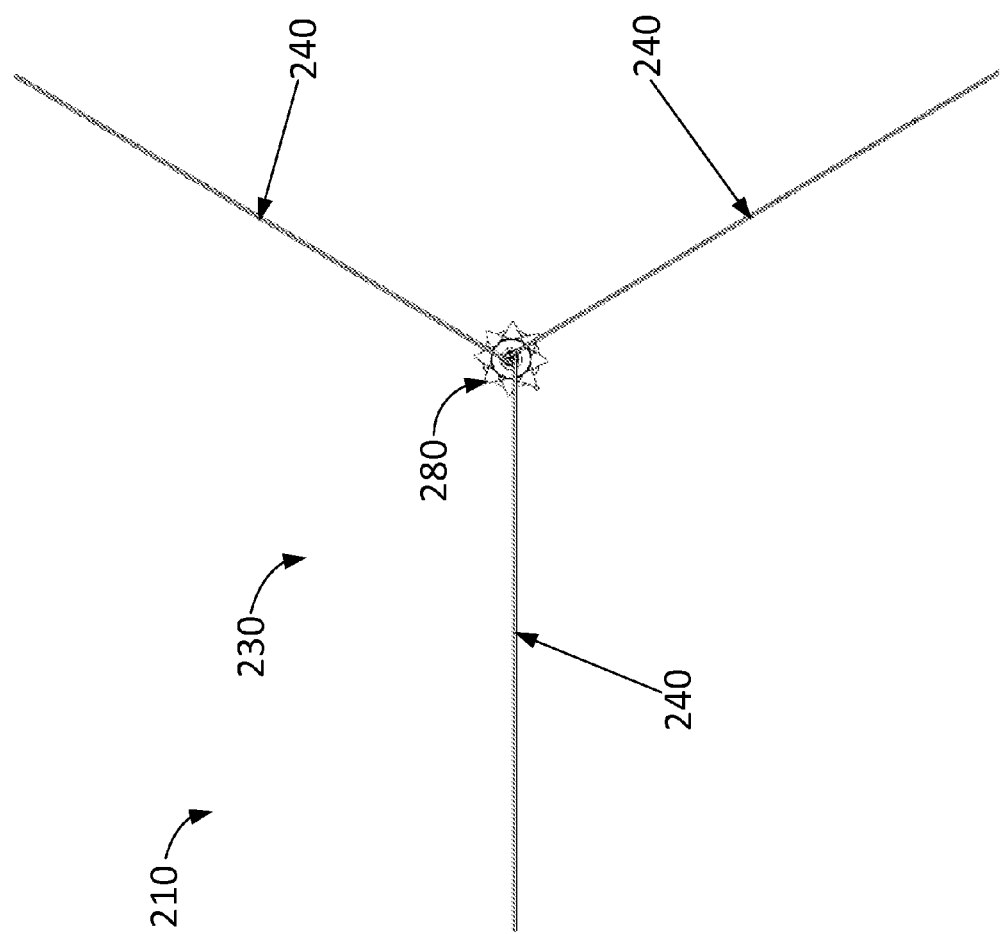

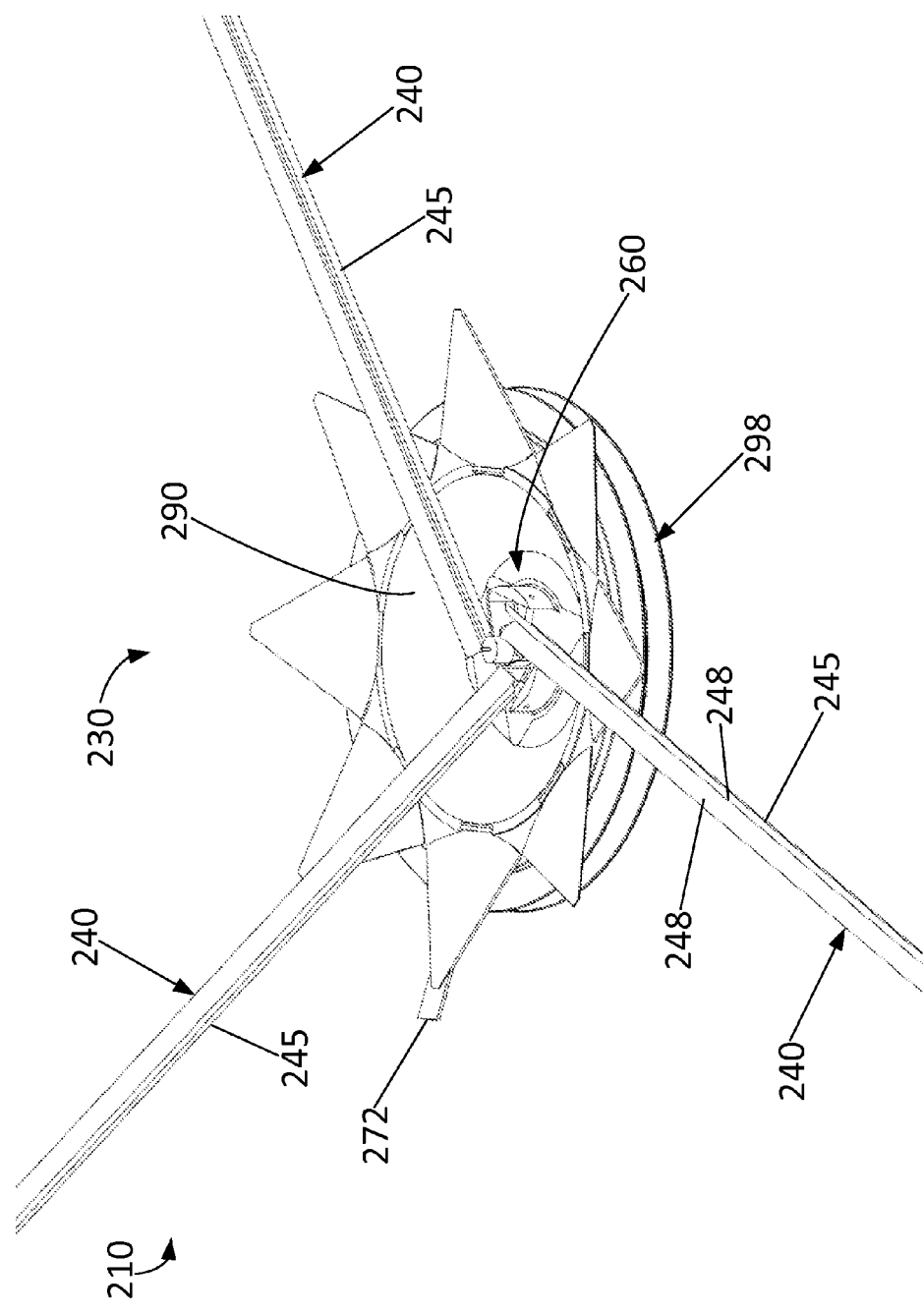

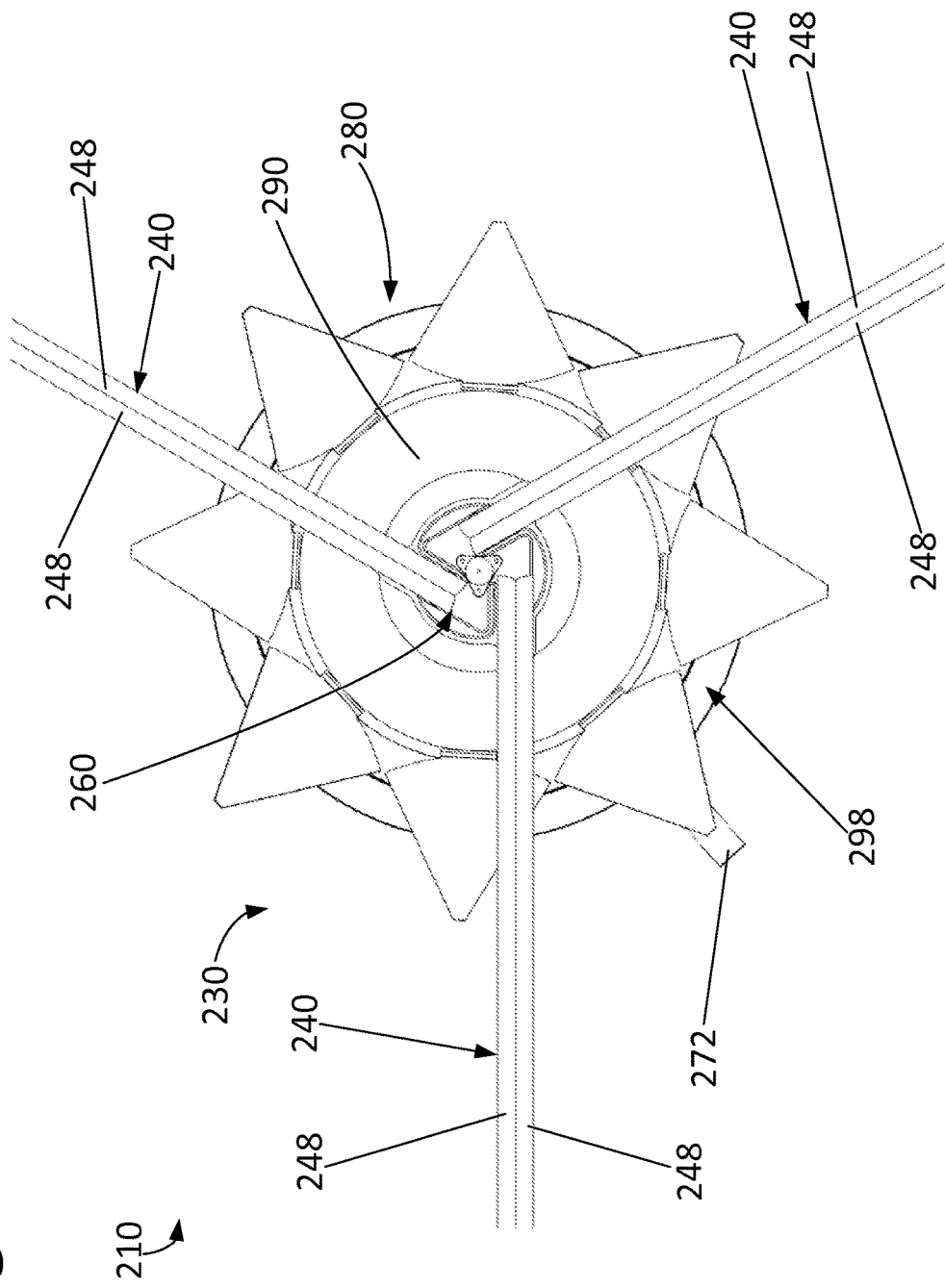

GOSSAMER APPARATUS AND SYSTEMS FOR USE WITH SPACECRAFT

CROSS-REFERENCE TO RELATED APPLICATIONS

This application claims the benefit of U.S. Provisional Patent Application Ser. No. 61/681,499 filed 9 Aug. 2012, entitled "GOSSAMER APPARATUS AND SYSTEMS FOR USE WITH SPACECRAFT," which is incorporated herein by reference in its entirety.

BACKGROUND

The present disclosure relates generally to gossamer apparatus and systems for use with spacecraft to increase a surface area (e.g., to form a drag surface defining the suface area) of the spacecraft and/or to decelerate a spacecraft, e.g., to modify the spacecraft's orbit, to de-orbit the spacecraft, for aerobraking the spacecraft, to lower the apogee of the orbit of the spacecraft, for providing a solar sail, etc.

An increasing number of spacecraft are located in low earth orbit. With spacecraft fragmentation, a growing population of orbital debris has been created. Spacecraft may be de-orbited at the end of their operational lives to lower the amount orbital debris. Various standards may require spacecraft to de-orbit within 25 years of the end of their operational life. Traditionally, chemical propulsion systems have been used to de-orbit spacecraft from low-earth orbit at the end of their operational life.

To reduce propellant requirements on spacecraft entering orbit around a planetary body with an atmosphere such as, e.g., Earth, Mars, etc., an "aerobraking" approach may be used. "Aerobraking" reduces the velocity of the spacecraft when initially arriving at a planetary body by using drag created by the atmosphere of the planetary body to reduce the eccentricity of the orbit (e.g. to change the orbit from a hyperbolic to an elliptical trajectory, or to circularize the orbit). In other words, a spacecraft may use aerobraking to reduce the velocity of the spacecraft. For example, the surface area of appendages already used by the spacecraft such as, e.g., solar arrays, etc., may be used for aerobraking.

Some space missions may require a spacecraft to lower its orbit without fully de-orbiting the spacecraft, e.g., reducing apogee to circularize an orbit. Traditionally, chemical propulsion systems may be used for orbit transfers such as, e.g., a partial Hohmann transfer.

Spacecraft may currently deorbit from low Earth orbit using chemical propulsion, electro-dynamic drag, electric propulsion, and natural orbit decay. Chemical propulsion systems are expensive and heavy, and must be integrated into the spacecraft design from conception. In addition, not all satellites require station keeping, orbital maneuvering, or propulsion based attitude control, and therefore, a need for a propulsion system apart from for de-orbiting may not exist. Propulsion systems are often high cost, and thus may represent a large investment for a part of the mission that does not directly contribute to operations.

Electro-dynamic tethers have been developed to de-orbit spacecraft. Electro-dynamic tethers may, however, require complex deployment and may have reliability issues. Further, each of chemical propulsion, electro-dynamic drag, and electric propulsion systems may require functions of the spacecraft systems to be operational at end of life. If the spacecraft systems fail during operations (e.g., prior to de-orbit), then de-orbit may not be able to be accomplished.

Natural orbit decay from atmospheric drag has also been used to de-orbit spacecraft, but the rate of decay is proportional to the surface area of the spacecraft. Most spacecraft in appreciably high orbits (e.g., about 600 kilometers to about 1000 kilometers) may not have a large enough surface area to produce sufficient drag to de-orbit the spacecraft within a 25 year period.

SUMMARY

The problems with modifying orbits of spacecraft with other approaches may be addressed by the exemplary gossamer apparatus and systems described herein. For example, the exemplary gossamer apparatus and systems may be low mass, low cost, scalable, modular, etc. and/or may have few integration requirements.

One exemplary system or apparatus for use on, or with, a spacecraft (e.g., for de-orbiting the spacecraft, for modifying the orbit of the spacecraft, for aerobraking the spacecraft, for decelerating the spacecraft, for increasing the drag of the spacecraft, etc.) may include a deployable gossamer apparatus (e.g., a gossamer structure) and a storage apparatus. The deployable gossamer apparatus may include a central mount portion (e.g., triangular-shaped, circular-shaped, ring-shaped defining an opening such that the central portion is couplable around a docking or separation system of the spacecraft, etc.), a plurality of rib members (e.g., spaced at equal angles around the central mount portion) extending from a proximal end portion to a distal end portion, and gossamer material coupled to and extending between at least two of the plurality of rib members. The proximal end portion of each rib member of the plurality of rib members may be coupled to the central mount portion, and each rib member of the plurality of ribs may be biased to extend along a rib axis (e.g., predisposed to lie along the rib axis).

The deployable gossamer apparatus may be configurable in at least a stowed configuration and a deployed configuration. The plurality of rib members may be wrapped around the central mount portion when the deployable gossamer apparatus is in the stowed configuration, and the plurality of rib members may be positioned to form a drag surface defining a surface area greater than the spacecraft's independent surface area to create a drag force on the spacecraft when the deployable gossamer apparatus is in the deployed configuration.

In at least one embodiment, the gossamer apparatus and systems may further include an electronic circuit chip that executes, or initiates, deployment (e.g., a transition of the deployable gossamer apparatus from the stowed configuration to the deployed configuration) at a certain date and/or time (e.g., after a selected amount of time has elapsed, etc.), at a command from the spacecraft, or based on a watchdog timer (e.g., to allow deployment without a functioning spacecraft). For example, the watchdog timer may be independent from other systems of the spacecraft, and therefore, may be self-reliant. In other words, the watchdog timer may operate independently from the rest of the spacecraft. The watchdog timer may be configured to start a clock, or timer, and "count down" a selected time period until deployment should occur. When the watchdog timer reaches the end of the selected time period, the watchdog timer may initiate a transition of the deployable gossamer apparatus from the stowed configuration to the deployed configuration. Further, in at least one embodiment, the entire exemplary gossamer apparatus and systems may be described as operating independently from the spacecraft (although the gossamer apparatus and systems may be coupled to the spacecraft). In at least one embodiment, may be activated by a signal from an operator.

The storage apparatus may be couplable to the spacecraft and configured to hold the deployable gossamer apparatus and to restrict deployment (e.g., movement of the rib members in the direction in which the rib members are biased, restricting the potential energy stored by the rib members, etc.) of the deployable gossamer apparatus when the deployable gossamer apparatus is in the stowed configuration.

In at least one embodiment, the gossamer apparatus may have the capability to detach from the spacecraft which may allow for modification of the spacecraft's orbit without completing a deorbit maneuver (e.g. detach after completing an orbit change maneuver, detach after lowering the spacecraft's orbit).

In one or more embodiments, each rib member of the plurality of rib members may include at least one lenticular spring (e.g., a carpenter's tape-shaped spring, lens-shaped spring, etc.), and each rib member may be configurable in at least a deployed, linear configuration and a stowed, nonlinear configuration. Each rib member may extend along a rib axis when in the deployed, linear configuration, and each rib member may extend nonlinearly when in the stowed, nonlinear configuration. For example, each rib member may be in the deployed, linear configuration when the deployable gossamer apparatus is in the deployed configuration and/or each rib member may be in the nonlinear configuration when the deployable gossamer apparatus is configured in the stowed configuration. In at least one embodiment, each rib member of the plurality rib members may include two lenticular springs, and each of the two lenticular springs may define or have a concave surface and a convex surface on the side opposite the concave surface (e.g., a carpenter's tape shape). The concave surface of each of the two lenticular springs of each rib member may be positioned such that the concave surfaces of each lenticular spring face each other, or face away from each other. In at least one embodiment, the lenticular springs may be coupled to each other (e.g., about an edge region of the springs, about a central region of the springs, etc.). Additionally, the lenticular springs may be coupled to each along the entire length of the springs or one or more portions of the length of the springs.

In one or more embodiments, the plurality of ribs portions may extend radially from the central mount portion when the deployable gossamer apparatus is configured in the deployed configuration. Further, in at least one embodiment, the plurality of ribs may store potential energy when the deployable gossamer apparatus is configured in the stowed configuration, and the stored potential energy of the plurality of ribs may provide forces that affect the deployment (e.g., kinetic movement) of the deployable gossamer apparatus from the stowed configuration to the deployed configuration when the storage apparatus releases the deployable gossamer apparatus. In one or more embodiments, each of the plurality of ribs may include one or more of steel alloys, titanium alloys, aluminum alloys, copper-beryllium alloys, glass fiber composites, carbon fiber composites, and polymer composites. In at least one embodiment, each of the plurality of rib members may be rotatably coupled to the central portion about a coupling axis perpendicular to the central axis. In at least one embodiment, the plurality of rib members may include at least three rib members.

In one or more embodiments, a gap may be defined between two rib members, which, in turn, may provide a gap in the gossamer material when the deployable gossamer apparatus is in a deployed configuration (e.g., the gap may simplify the wrapping of the ribs and gossamer material about the central mount portion using at least one of a variety of fold patterns such as, e.g., Chinese fan fold). The rib members and gossamer material may be wrapped around the central mount portion when in the stowed configuration. In at least one embodiment, the gossamer material may include polyimide material.

In one or more embodiments, the deployable gossamer apparatus, when in the deployed configuration, may offset the center of pressure from the center of gravity of the spacecraft to stabilize the spacecraft.

In at least one embodiment, the storage apparatus may include one or more wall portions to restrain the deployable gossamer apparatus in the stowed configuration. Further, the storage apparatus may include actuation apparatus configured to release the deployable gossamer apparatus from being restrained by the storage apparatus so as to be configured in the deployed configuration (e.g., the actuation apparatus may release the one or more wall portions of the storage apparatus such that the one or more wall portions may move about hinges and release the deployable gossamer apparatus and/or move out of the way of the deployable gossamer apparatus). In at least one embodiment, the actuation apparatus may include a shape-memory-alloy actuator.

In one or more embodiments, a central axis may extend through the central mount portion, and the plurality of ribs portions may be wrapped around the central mount portion about the central axis when the deployable gossamer apparatus is in the stowed configuration.

In one or more embodiments, the deployable gossamer apparatus may lie along a storage plane when in the stowed configuration, and the deployable gossamer apparatus may extend outside of the storage plane when in the deployed configuration.

One exemplary deployable gossamer apparatus may include a thin polyimide film (e.g. MYLAR or KAPTON blanket) that is folded and stowed during spacecraft operations and deployed at End-of-Life (EOL) of spacecraft. In at least one embodiment, lenticular springs may be used as structure for the gossamer material. Further, the deployable gossamer apparatus may use a simple release mechanism such as, e.g., a shape-memory alloy mechanism actuated by simple drive circuit powered by a primary battery or spacecraft power, a burn wire, frangible or exploding nut, etc.

One or more exemplary systems described herein may be single-fault tolerant for on-demand deployment and for prevention of premature deployment. In at least one embodiment, a deployable gossamer apparatus gossamer sail may wrap around a central mount portion with a "Chinese fan-fold" configuration and/or using any other folding technique. In at least one embodiment, lenticular springs may provide structure to the deployable gossamer apparatus (e.g., the gossamer material when the deployable gossamer apparatus is configured in a deployed configuration).

In at least one embodiment, the storage apparatus may be configured to stow the deployable gossamer apparatus, to restrain the deployable gossamer apparatus in a stowed configuration, and to restrict the deployable gossamer apparatus from moving into a deployed configuration. In at least one embodiment, a shape memory alloy actuator may affect the release of the deployable gossamer apparatus from the stowed configuration. After being released, the deployable gossamer apparatus may unfold, or deploy, independently. In other words, the deployable gossamer apparatus may provide energy (e.g., stored potential energy) to deploy itself after being released. In at least one embodiment, rib members of the deployable gossamer apparatus may store the potential energy and may deploy the deployable gossamer apparatus when released (e.g., released from being restrained).

In at least one embodiment, the system may include storage apparatus to stow the deployable gossamer apparatus such as, e.g., a cover coupled, or tethered, to the system to prevent orbital debris impact on the ribs, gossamer portions, actuator, and drive circuit. In at least one embodiment, the only interfaces to the spacecraft, e.g., a satellite, rocket body, etc., may be a structural attachment interface and a signal interface for sending/receiving an I/O release signal.

In at least one embodiment, the I/O release signal may include a status signal from the spacecraft computer and a watchdog timer. The status signal may be repeated on a regular interval. The watchdog timer may be reset each time it receives the signal. If the spacecraft fails, then, after a selected, or specified, length of time, the watchdog timer may expire and the system will be automatically deployed. Alternatively, the spacecraft can initiate, command, or direct deployment.

In at least one embodiment, the gossamer portions may include gossamer material such as, e.g., DUPONT KAPTON, polyimide film. In at least one embodiment, when in the stowed configuration, the deployable gossamer apparatus may have a folding approach to maximize the packing ratio. In at least one embodiment, the central mount portion may be triangular. In at least one embodiment, when in the deployed configuration, the deployable gossamer apparatus may have a diameter of about 10 meters and a surface area of about 75 meters squared. Other embodiments may be sized to match the requirements of the spacecraft mission. In at least one embodiment, the deployable gossamer apparatus may wrap around a small specific structure. For example, the deployable gossamer apparatus may be configured to wrap around an existing structure like a launch vehicle separation system, e.g., a Marman clamp, Lightband, etc.

In at least one embodiment, the deployable gossamer apparatus may define shuttlecock-like design when in the deployed configuration such that it may provide a center of pressure offset from the center of gravity offset. Further, the exemplary system may apply a stabilizing moment to the spacecraft, assuring the cross-section is perpendicular to the velocity vector, minimizing de-orbit time, etc.

One exemplary system for increasing the surface area (e.g., to form a drag surface defining the suface area) of a spacecraft may include a deployable gossamer apparatus. The deployable gossamer apparatus may include a central mount portion, a plurality of rib members, and gossamer material. The plurality of rib members may extend from a proximal end portion to a distal end portion. The proximal end portion of each rib member of the plurality of rib members may be coupled to the central mount portion and each rib member of the plurality of rib members may be biased to extend along a rib axis to deploy the deployable gossamer apparatus. The gossamer material may be coupled to and extend between at least two of the plurality of rib members. The deployable gossamer apparatus may be configurable in at least a stowed configuration and a deployed configuration.

In at least one embodiment, the plurality of rib members may be positioned to provide a surface area greater than the spacecraft when in the deployed configuration.

In at least one embodiment, the exemplary system may include storage apparatus couplable to the spacecraft and configurable in a storage configuration and a released configuration. The storage apparatus may be configured to restrict deployment of the deployable gossamer apparatus from the stowed configuration to the deployed configuration when in the storage configuration. Further, the storage apparatus may be configured to allow deployment of the deployable gossamer apparatus from the stowed configuration to the deployed configuration without providing energy to the deployable gossamer apparatus for deployment when in the released configuration.

In at least one embodiment, when in the stowed configuration, the plurality of rib members may be wrapped around the central mount portion and store potential energy to provide movement of the deployable gossamer apparatus from the stowed configuration to the deployed configuration.

In at least one embodiment, the plurality of rib members may be wrapped around the central mount portion and lie along a storage plane when in the stowed configuration where the storage plane is perpendicular to a central axis, and the plurality of rib members may be positioned to provide a surface area greater than the spacecraft and extends outside of the storage plane when in the deployed configuration.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 2A is a perspective view of the spacecraft and the exemplary system of FIG. 1 including a deployable gossamer apparatus configured in a deployed configuration.

FIGS. 11E-11F are a perspective view and a plan view, respectively, the exemplary system of FIGS. 11A-11B including the storage apparatus configured in the released configuration and the deployable gossamer apparatus without gossamer material configured in a deployed configuration.

FIGS. 11G-11H are a perspective view and a top, plan view, respectively, of a central region of the exemplary system of FIGS. 11E-11F.

DETAILED DESCRIPTION OF EXEMPLARY EMBODIMENTS

Figure 1:
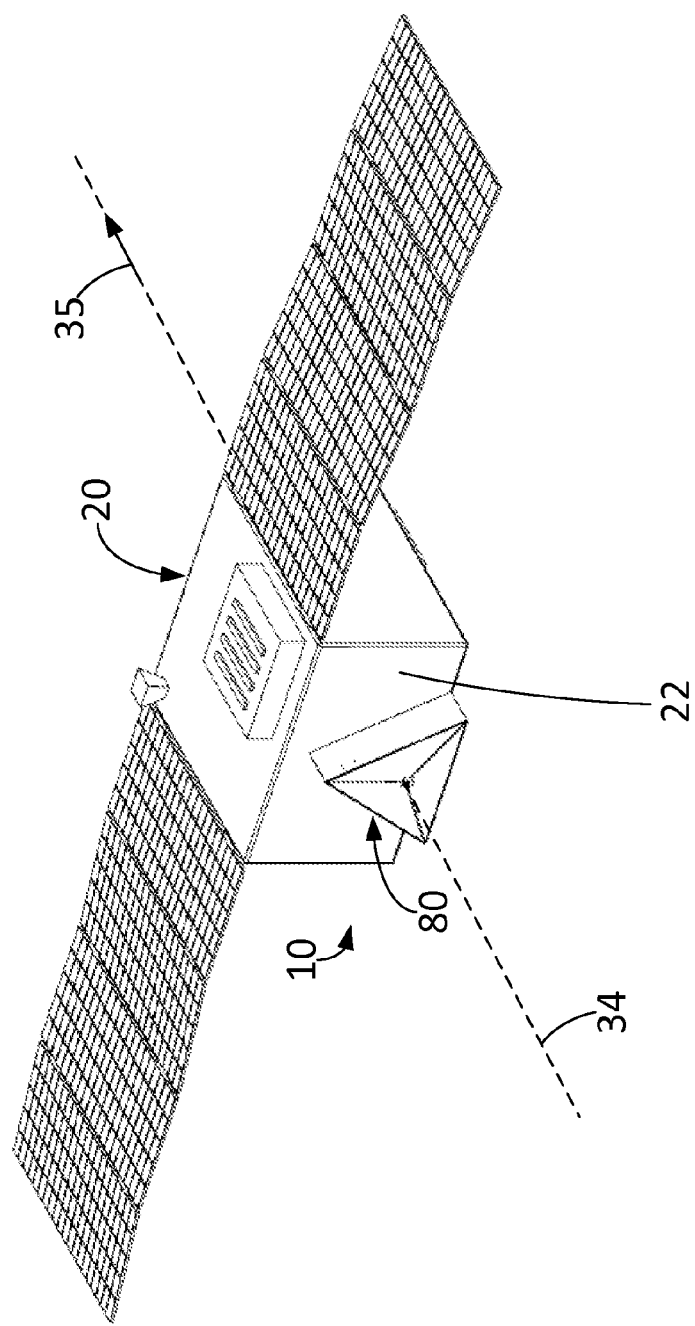
FIG. 1 is a perspective view of an exemplary system for increasing the surface area of a spacecraft.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary embodiments shall be described with reference to FIGS. 1-12. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Exemplary system for increasing the surface area of a spacecraft are described herein. Generally, the exemplary system may include a deployable gossamer apparatus that may be stowed until it is deployed. For example, the deployable gossamer apparatus may be stowed using a storage apparatus until the spacecraft is ready to be decelerated (e.g., for de-orbit, for aerobraking, etc.) and then the deployable gossamer apparatus may be released by the storage apparatus and deployed to increase the surface area of the spacecraft.

The exemplary system may be described in terms of various configurations or states. For example, when the deployable gossamer apparatus, or structures, of the exemplary system are stowed and thus may not be configured to increase the surface area of the spacecraft, it may be described herein the deployable gossamer apparatus is in, or configured in, a stowed configuration. Further, when the deployable gossamer apparatus, or structures, of the exemplary system are deployed and thus increasing the surface area of the spacecraft, it may be described herein that the deployable gossamer apparatus is in, or configured in, a deployed configuration.

As described herein, the exemplary system may include storage apparatus generally configured to store, protect, etc. the deployable gossamer apparatus and to restrict the deployable gossamer apparatus from deploying (e.g., transitioning from the stowed configuration to the deployed configuration). The storage apparatus may also be described in terms of configurations or states. For example, the storage apparatus may be described as being in, or configured in, a storage configuration when containing, enclosing, housing, etc., the deployable gossamer apparatus and restricting the deployable gossamer apparatus from deploying. Further, when the storage apparatus releases (e.g., stops restricting) the deployable gossamer apparatus from the stowed configuration to transition (e.g., deploy, transform, move, etc.) from the stowed configuration to the deployed configuration, the storage apparatus may be described as being in, or configured in, a released configuration.

The deployable gossamer apparatus of the exemplary system for increasing the surface area or projected area (e.g., to form a drag surface) of a spacecraft may be configured to store potential energy that provides the transition from the stowed configuration to the deployed configuration. The deployable gossamer apparatus may be described as being energy independent from other portions of the system and/or the spacecraft the system is attached thereto. For example, the deployable gossamer apparatus may not require energy from the other portions of the system and/or the spacecraft. Instead, for example, other portions of the exemplary system may provide restriction, or inhibition, of the stored potential energy of the deployable gossamer apparatus from releasing such that the deployable gossamer apparatus does not deploy until a selected time (e.g., end of life, directed to be deployed by a user, etc.). In some of the embodiments described herein, the deployable gossamer apparatus may include lenticular springs to store potential energy to deploy the deployable gossamer apparatus (e.g., to transition the deployable gossamer apparatus from a stowed configuration to a deployed configuration).

To increase the surface area of a spacecraft, the deployable gossamer apparatus may change shape and size when transitioning from the stowed configuration to the deployed configuration. For example, the deployable gossamer apparatus may be described as lying (or extending along) a plane when in the stowed configuration (e.g., so as to occupy less space, etc.) and may be described as extending outside of the plane when in the deployed configuration to, e.g., define a shuttlecock-like shape to increase the surface area of the spacecraft and stabilize the trajectory and/or attitude of the spacecraft.

Multiple views of an exemplary system 10 for increasing the surface area of a spacecraft are depicted in FIGS. 1-3. As shown in FIG. 1, the exemplary system 10 may be coupled to, or attached to, a spacecraft 20. In other embodiments, the exemplary system 10 may be integral, or part of the spacecraft 20. The spacecraft 20 may be described as lying along a central axis 34. In this example, the exemplary system 10 is also shown centered on central axis 34. The central axis 34 may also be the direction of travel, or trajectory, of the spacecraft 20. For example, the spacecraft 20 may be described as moving along central axis 34 in direction 35.

As shown, the exemplary system 10 is mounted (e.g., attached, coupled) to a rear surface 22 of the spacecraft 20. In other embodiments, the exemplary system 10 may be mounted on any side, face, surface, appendage, portion, region, or any other suitable location on, within, or extending from the spacecraft 20. The spacecraft 20 may be any spacecraft, target object, or space object on which the exemplary system 10 may be used to increase the surface area of the spacecraft 20. The exemplary system 10 may be attached to the spacecraft 20 by rivets, bolts, welds, adhesives, brazed joints, and/or any other fastening technique known to one skilled in the art.

The exemplary system 10 for increasing the surface area or projected area of a spacecraft 20 may include a deployable gossamer apparatus 30 and a storage apparatus 80. The storage apparatus 80 may be the portion of the system 10 that may be coupled, or attached, to the external face 22 of spacecraft 20. As shown in FIG. 1, the storage apparatus 80 may be configured in the storage configuration such that the deployable gossamer apparatus 30 is restrained and enclosed, covered, wholly or partially etc. by the storage apparatus 80. In this embodiment, the storage apparatus 80 may completely enclose the deployable gossamer apparatus 30 when in the storage configuration, and thus the deployable gossamer structure 30 may not be visible in FIG. 1. Since the deployable gossamer apparatus 30 is configured in the stowed configuration (e.g., and restrained by the storage apparatus in the storage configuration), the surface area of the spacecraft is not increased by the system 10 in FIG. 1. Further, the attachment of the system 10 to the spacecraft 20 may be made between the storage apparatus 80 (or portion thereof) and/or the deployable gossamer apparatus 30 and the spacecraft 20.

Figure 2B:
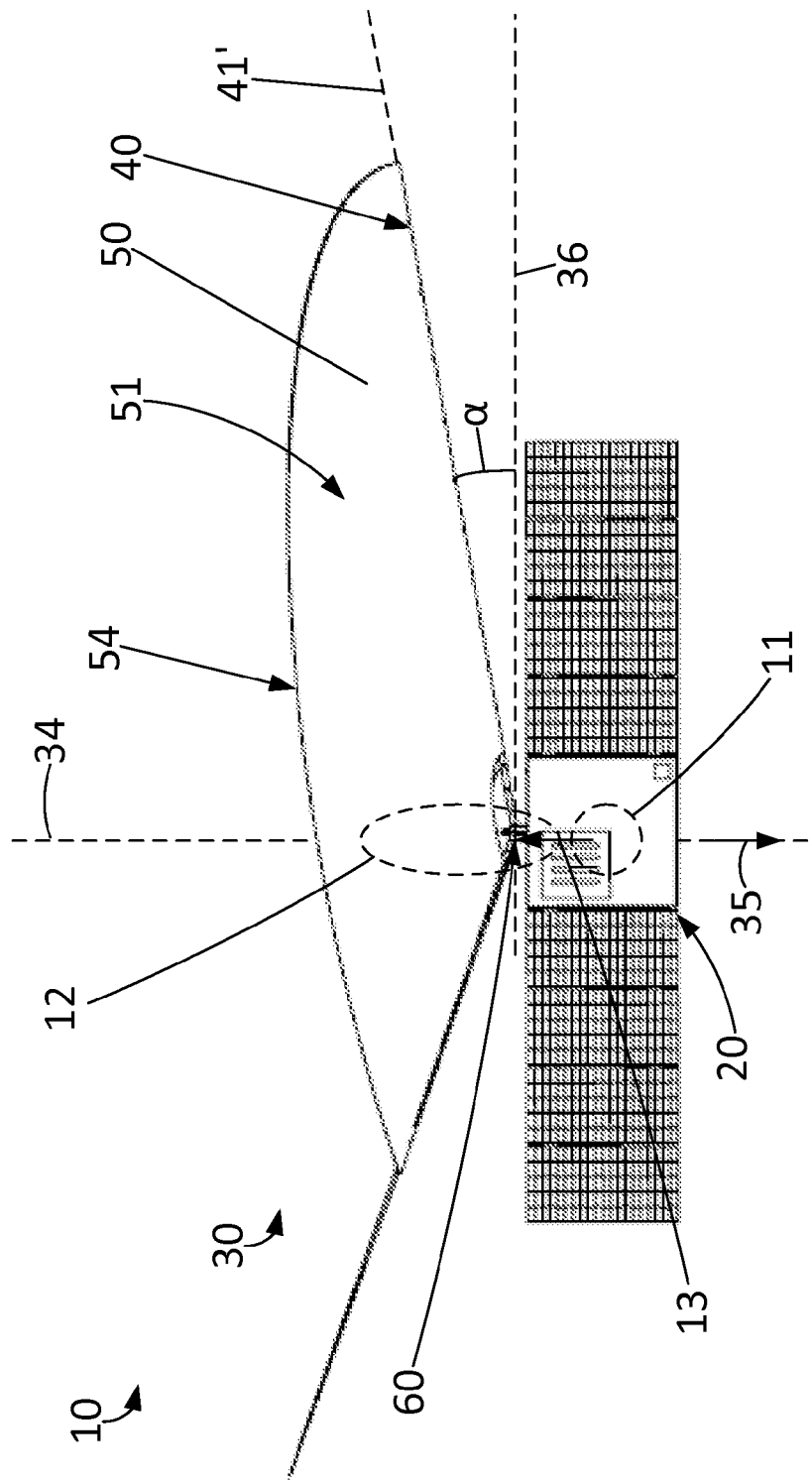
FIG. 2B is a side elevation view of the spacecraft and the exemplary system of FIG. 2A.
Figure 2C:
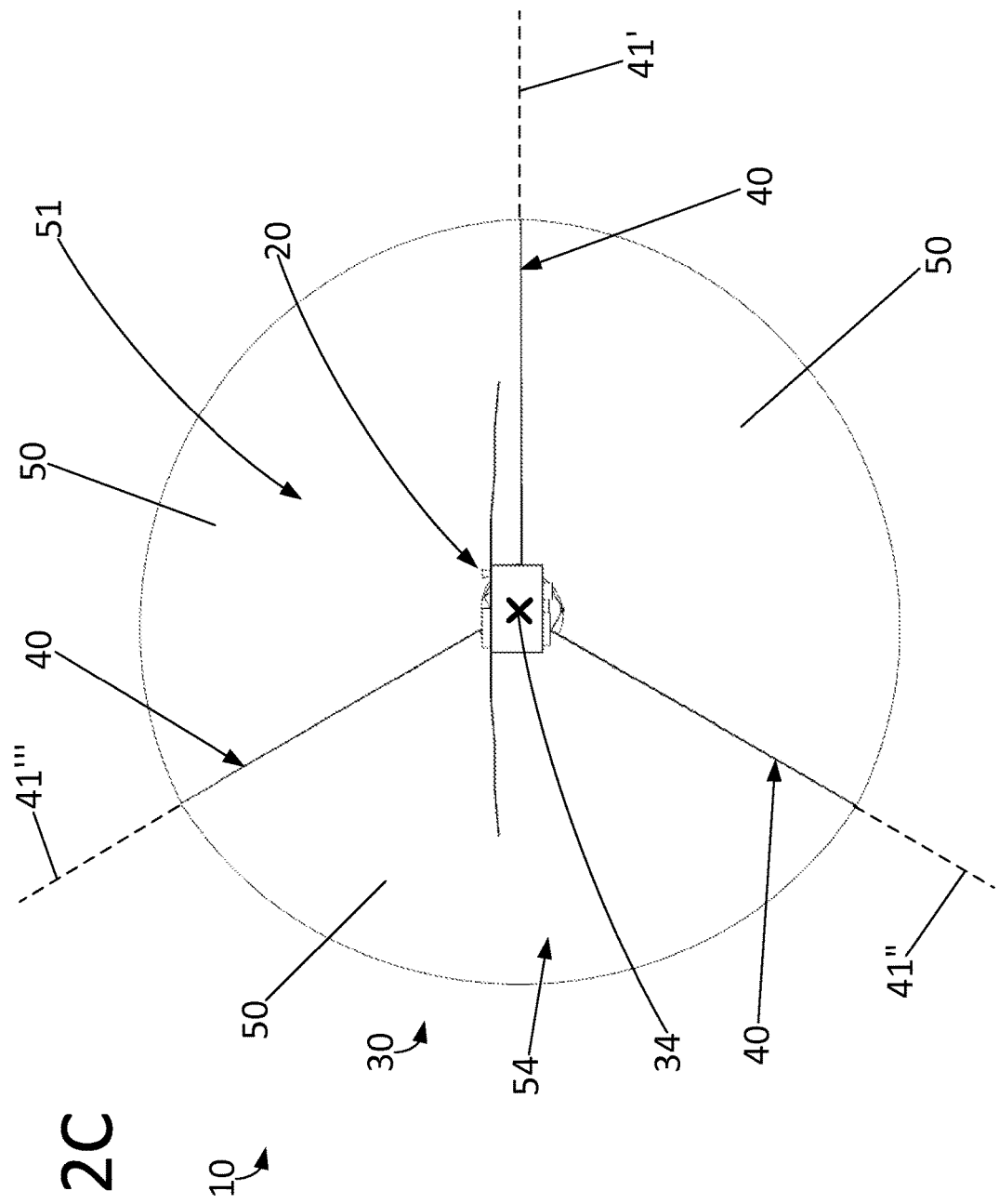
FIG. 2C is a front elevation view of the spacecraft and the exemplary system of FIG. 2A.

When the surface area of the spacecraft is to be increased (e.g., for deceleration, for aerobraking, for de-orbiting, or for modifying an orbit etc.), the deployable gossamer apparatus 30 may be transitioned from the stowed configuration to the deployed configuration. The deployable gossamer apparatus 30 is depicted in FIGS. 2A-2C in the deployed configuration. As shown in FIG. 2C, the surface area defined by deployable gossamer apparatus 30 when deployed increases the surface area or projected area of spacecraft 20 when taken, or viewed, along the central axis 34. It is to be understood that prior to deployment of the deployable gossamer apparatus 30, the spacecraft 20 may not be traveling along axis 34, but after the deployable gossamer apparatus 30 is deployed, the spacecraft 20 may settle into a flight path or trajectory along the axis 34 due to the configuration (e.g., shape of the draft surface, shuttle-cock shape, etc.) provided by the deployed deployable gossamer apparatus 30. Further, although the entire surface area of the spacecraft may be is described as being increased, in particular, it may be described that the deployable gossamer structure 30 increases the surface area perpendicular to the axis 34. In other words, if the spacecraft 20 and deployable gossamer structre 30, when deployed in the deployed configuration, are viewed along the axis 34 and planarized, or flattened, (such as when depicted on a sheet of paper as in FIG. 2C), the surface area of the spacecraft 20 and deployable gossamer structure 30 will have increased. In other words, the area defined by an orthographic projection of the spacecraft 20 and deployable gossamer structre 30, when deployed in the deployed configuration, onto a plane perpendicular to the central axis 34 (e.g., as in FIG. 2C), will have increased.

The deployable gossamer apparatus 30 may include a plurality of rib members 40 and gossamer material 51 extending between the rib members 40 as shown in FIG. 2A. The gossamer material 51 may be coupled (e.g., adhered, welded, fastened, glued, etc.) to the rib members 40 (e.g., continuously, at multiple points along the rib members 40, etc.). In at least one embodiment, the gossamer material 51 may be coupled to the rib members 40 at only the proximal and distal end portions 42, 44. The deployable gossamer apparatus 30 may further include a central mount portion 60 that may be described in further detail herein with respect to FIGS. 3B, 3D and 7A-7B. The plurality of rib members 40 may be configured to provide structural support to gossamer material 51 extending between the rib members 40. For example, the gossamer material 51 may be flexible, non-resilient material that may provide the surface area (e.g., drag surface, etc.) increase with the support of the rib members 40. In at least one embodiment, the gossamer material 51 may also have some limited stiffness to it, e.g., provided by creases in the material, which may help to maintain the shape of the deployed gossamer apparatus when in the deployed configuration. Further, as will be described further herein, the rib members 40 may be configured to provide the energy (e.g., potential energy, strain energy) for deployment (e.g., for passive deployment) of the deployable gossamer apparatus 40.

Generally, the storage apparatus 80 may be used to restrict, or hold, the deployable gossamer apparatus 30 in the stowed configuration. In the embodiment depicted in FIGS. 1-3, the storage apparatus 80 includes a plurality of wall portions. As shown in FIGS. 3A-3D, the plurality of wall portions may include side wall portions 90, top wall portions 82, 84, and back wall portions 88. In at least one embodiment, the back wall portion 88 may not be included in the storage apparatus 80, and instead, the storage apparatus 80 may be directly attached to the spacecraft 20 without a back wall portion 88. The storage apparatus 80 may further include hinges 92 coupling the side wall portions 90 to the top wall portions 82, 84. Hinges 92 may also couple side wall portions 90 to back wall portion 88, if present. The wall portions 82, 84, 90 may include (e.g., be formed of, be manufactured of, etc.) one or more metallic materials, one or more polymeric materials, one or more composite materials, and/or any combination of suitable materials.

The exemplary system 10 may further include actuation apparatus 70 that is configured to unlock or release the storage apparatus 80 from the storage configuration to transition to the released configuration thereby releasing the deployable gossamer apparatus 30, which allows the deployable gossamer apparatus 30 to move from the stowed configuration to the deployed configuration. In essence, the actuation apparatus 70 releases the deployable gossamer apparatus 30 to deploy into the deployed configuration. The actuation apparatus 70 will be described further herein with respect to FIGS. 3A-3D.

As described, the deployable gossamer apparatus 30 may be configurable in at least a stowed configuration as shown in FIG. 1 and a deployed configuration as shown in FIGS. 2A-2C. As shown in the exemplary system 10, the deployable gossamer apparatus may include four rib members (e.g., two rib members extend adjacently to provide a break in the gossamer material 51 to provide the folding as will be described further herein). In other embodiments, any number of rib members 40 may be included as part of the deployable gossamer apparatus 30 to, e.g., support the gossamer material 51. For example, the deployable gossamer apparatus 30 may include one or more rib members, two or more rib members, three or more rib members, four or more rib members, six or more rib members, eight or more rib members, ten or more rib members, twelve or more rib members, twenty or more rib members, etc. and/or four or less rib members, six or less rib members, eight or less rib members, ten or less rib members, twelve or less rib members, twenty or less rib members, thirty or less rib members, forty or less rib members, fifty or less rib members, etc.

The rib members 40 of the deployable gossamer apparatus 30 may be described as extending from a proximal end portion 42 that may be coupled to a central mount portion 60 (e.g., as shown and described with reference to FIGS. 7A-7B) to a distal end portion 44. As described herein, each rib member 40 may be biased to extend along a rib axis 41, 41', 41", etc. In other words, the rib members 40 may be predisposed to lie, or extend, along the rib axis. For example, the "natural" or lowest energy state of the rib members 40 may be extending, or lying, along their respective rib axis. Further, the rib members 40 may be described as storing potential energy when not extending along their respective rib axis may be described as having released their stored potential energy when extending along their respective rib axis. As such, if the rib members 40 are unrestricted or unrestrained by any other portion or object, the rib members 40 may move (e.g., unwind, unfurl, etc.) as will be described herein with respect to FIGS. 5A-5C.

As shown in FIG. 2C, the plurality of rib members 40 may be spaced equidistantly and equilaterally about the central mount portion 60 and/or central axis 34. In other embodiments, the plurality of rib members 40 may not be spaced equidistantly and equilaterally and instead may be unequally spaced. Additionally, the rib members 40 may extend radially (e.g., as opposed to tangentially) from the central mount portion 60 and/or central axis 34. In other embodiment, the rib members 40 may extend in a partially radial direction, or have a radial component to the extension direction, from the central mount portion 60 and/or central axis 34.

The rib members 40 may include (e.g., be formed of, be manufactured or fabricated using, etc.) one or more of steel alloys, titanium alloys, copper-beryllium alloys, glass fiber composites, polymer composites, carbon fiber composites, polymer composites, or any other suitable material.

When in the stowed configuration as shown in FIG. 1, the deployable gossamer apparatus 30 (and portions/components therefore) may be described as being located (e.g., lying) substantially in a plane perpendicular to the central axis 34. Although the deployable gossamer apparatus 30 is in the deployed configuration, the storage plane 36 may be represented by a dotted line in FIG. 2B. When in the deployed configuration, the deployable gossamer apparatus 30 (and portions/components therefore) may be described as extending outside of the storage plane 36 in a plane perpendicular to the central axis 34.

In the deployed configuration, the rib portions 40 may form an angle α between the storage plane 36 and the rib axes 41', 41", 41''' to create a "shuttlecock" design or shape. Although in this embodiment, each rib member 40 has the same angle α, in other embodiments each rib member 40 may have a different angle α from each other. Additionally, this "shuttlecock" shape, or any shape that the exemplary deployable gossamer apparatus 30 may take in the deployed configuration, may be maintained at least partially by the gossamer material 51 extending between the rib members 40. For example, the rib members 40 may extend into their biased, lowest energy state pulling the gossamer material 51 therebetween into the proper or desired shape configuration (e.g., shuttlecock shape) upon deployment (further, e.g., the gossamer material 51 may also restrain the movement of the rib members 40 as they deploy or restrict to their position when in the deployed configuration such that a desired angle α is achieved). In another embodiment, the rib members 40 may assume an out-of-plane orientation by means of a torsional spring or linear spring at or near their attachment point to the central mount portion 60.

When in the deployed configuration, the deployable gossamer stricture 30 may passively stabilize spacecraft 20 by utilizing drag forces resultant from interaction of the gossamer material 51 and the rarified upper atmosphere of a planetary body. More specifically, the plurality of rib members 40 are positioned to form a drag surface with gossamer material 51 defining a surface area (e.g., a surface area when viewed along the axis 34 as shown in FIG. 2C) greater than the spacecraft 20 to decelerate the spacecraft 20 when in the deployed configuration. The surface area may be taken perpendicular to the central axis 34. In other words, when looking at the spacecraft from either end of central axis 34 such as when looking at FIG. 2C, the surface area of the spacecraft will have increased when the deployable gossamer apparatus 30 is in the deployed configuration.

The deployed deployable gossamer apparatus 30 may be described as offsetting the center of pressure from the center of gravity of the spacecraft 20 to stabilize the spacecraft 20. For example, as shown in FIG. 2B, prior to the deployment of the deployable gossamer apparatus 30, both the center of gravity and center of pressure may be located proximate area 11. After full deployment of the deployable gossamer apparatus 30 in the deployed configuration as shown in FIG. 2B, the center of gravity may remain proximate area 11 while the center of pressure may be located proximate area 12. In other words, the center of pressure may have moved to an area, or location, 11 in a direction 13 opposite the trajectory direction 35 (i.e., the direction that the spacecraft 20 may settle into after deployment of the deployable gossamer structure).

When the deployable gossamer apparatus 30 is in the stowed configuration, the plurality of rib members 40 and the gossamer material 51 may occupy a smaller space than when in the deployed configuration. In this embodiment, the plurality of rib members 40 and the gossamer material 51 may be wrapped around the central mount portion 60 when the deployable gossamer apparatus 30 is in the stowed configuration as shown in FIG. 3B and FIG. 3D. Although the deployable gossamer apparatus 30 is shown in the stowed configuration in FIG. 3D even though the storage apparatus 80 is in the released configuration, it is to be understood that the deployable gossamer apparatus 30 may begin, or initiate, transitioning (e.g., moving, unfurling, unwinding, deploying, etc.) into the deployed configuration as soon as the storage apparatus 80 is in the released configuration. In other words, the rib members 40 of the deployable gossamer apparatus 30 may begin to immediately move out of their stowed configuration upon opening or releasing of the storage apparatus 80, and therefore, FIGS. 3B and 3D may not depict the actual deployment dynamics of the deployable gossamer apparatus 30.

The gossamer material 51 may include, e.g., one or more polyimides, MYLAR®, DUPONT KAPTON®, or other film, etc.). The material may be selected to withstand a folding requirement and to meet a packing factor needed to fit the deployable gossamer apparatus 30 in the storage apparatus 80. As described herein, the gossamer material 51 may be coupled to and extend between at least two of the plurality of rib members 40. As shown, a gossamer portion 50 may be a portion of the gossamer material 51 that extends between two rib members 40. Further, the gossamer material 51 may be reflective or non-reflective. For example, if the deployable gossamer apparatus 30 is configured to be used in an aerobraking or de-orbiting operation, the gossamer material 51 may be non-reflective. Further, for example, if the deployable gossamer apparatus 30 is configured to be used in a solar sail operation, the gossamer material 51 may be reflective.

The deployed configuration of the deployable gossamer apparatus 30 may be described as forming a deployed sail 54 that may include a roughly, or substantially circular, projection as shown in FIG. 2C. Further, the shape of the deployed sail 54 may be maintained by tension between the rib members 40. Also, in at least one embodiment, the deployable gossamer apparatus 30 may include a stiffener around the distal perimeter, or circumference, of the deployed sail 54. Further, wrinkles in the gossamer material 51 and/or any other methods known to one skilled in the art of deployable gossamer apparatus may provide the shape of the deployed sail 54.

Although as depicted, the deployable gossamer apparatus 30 includes three gossamer portions 50, it is to be understood that the deployable gossamer apparatus 30 may include plurality of gossamer portions 50 to form a deployed sail 54 that may provide a triangular, rectangular, pentagular, etc. projection. In at least one embodiment, each gossamer portion 50 may be an ellipsoidal segment.

Figure 3A:
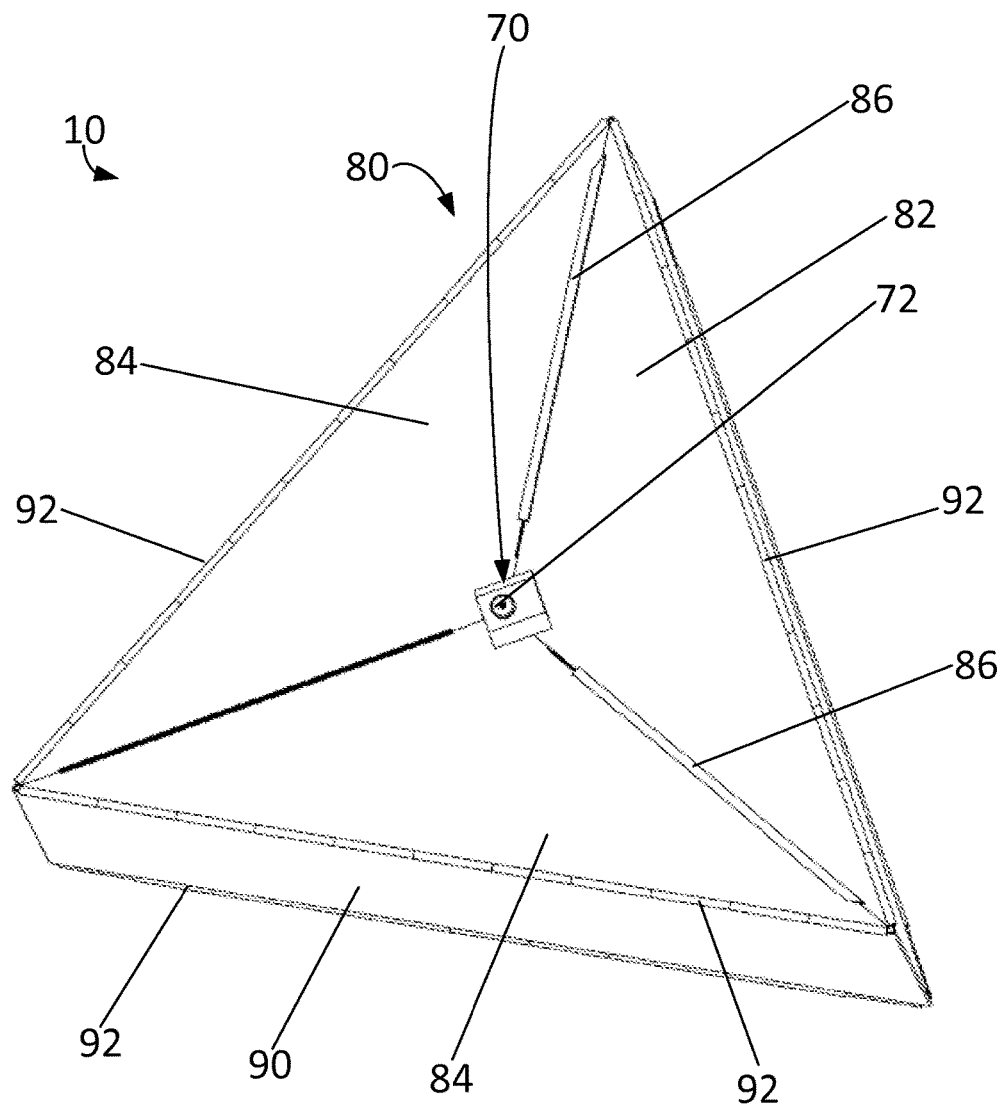
FIG. 3A is a perspective view of the exemplary system of FIG. 1 including a deployable gossamer apparatus in a stowed configuration.
Figure 3B:
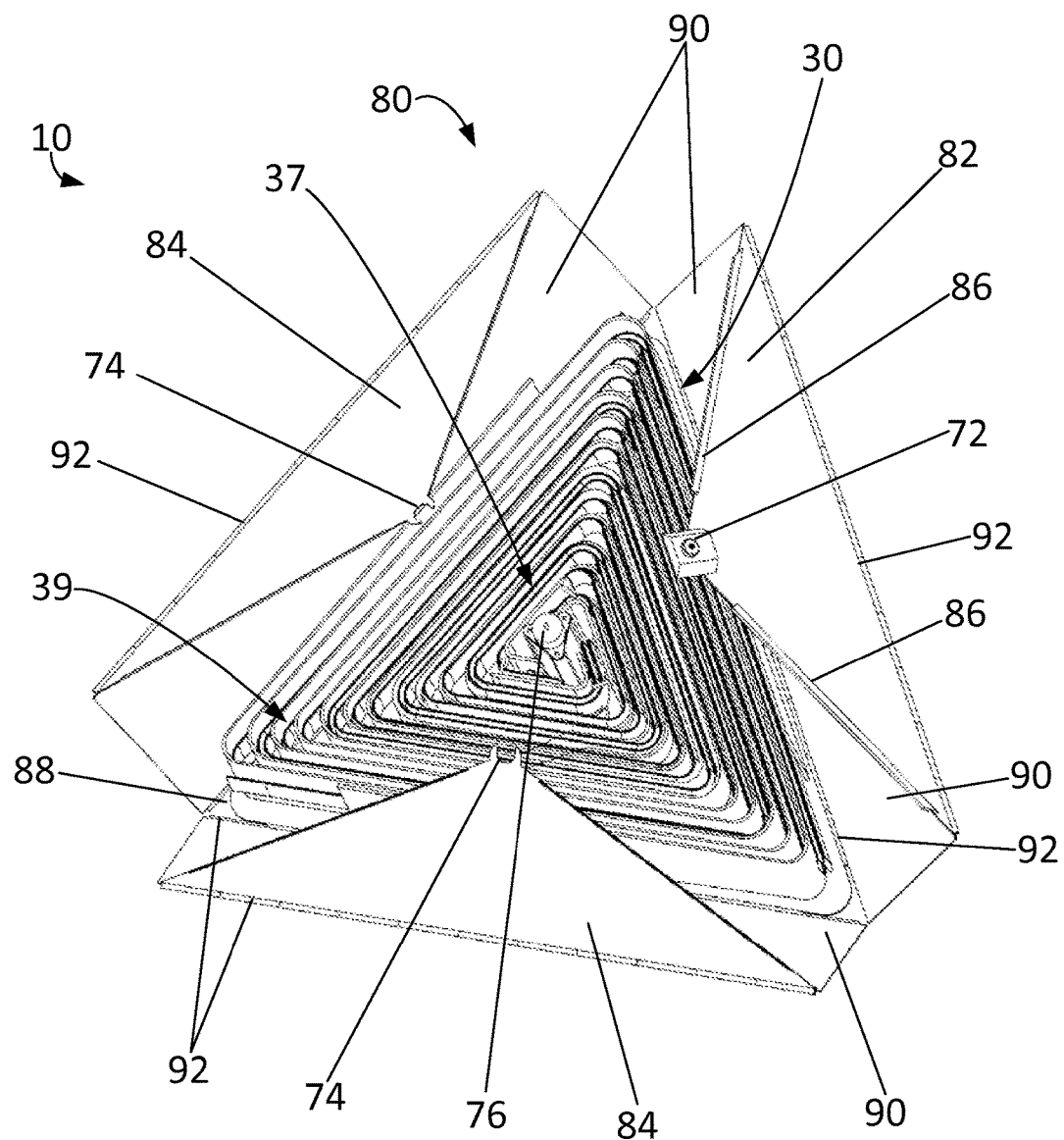
FIG. 3B is a perspective view of the exemplary system of FIG. 1 including a storage apparatus transitioning from a storage configuration to a released configuration to release the deployable gossamer apparatus.
Figure 3C:
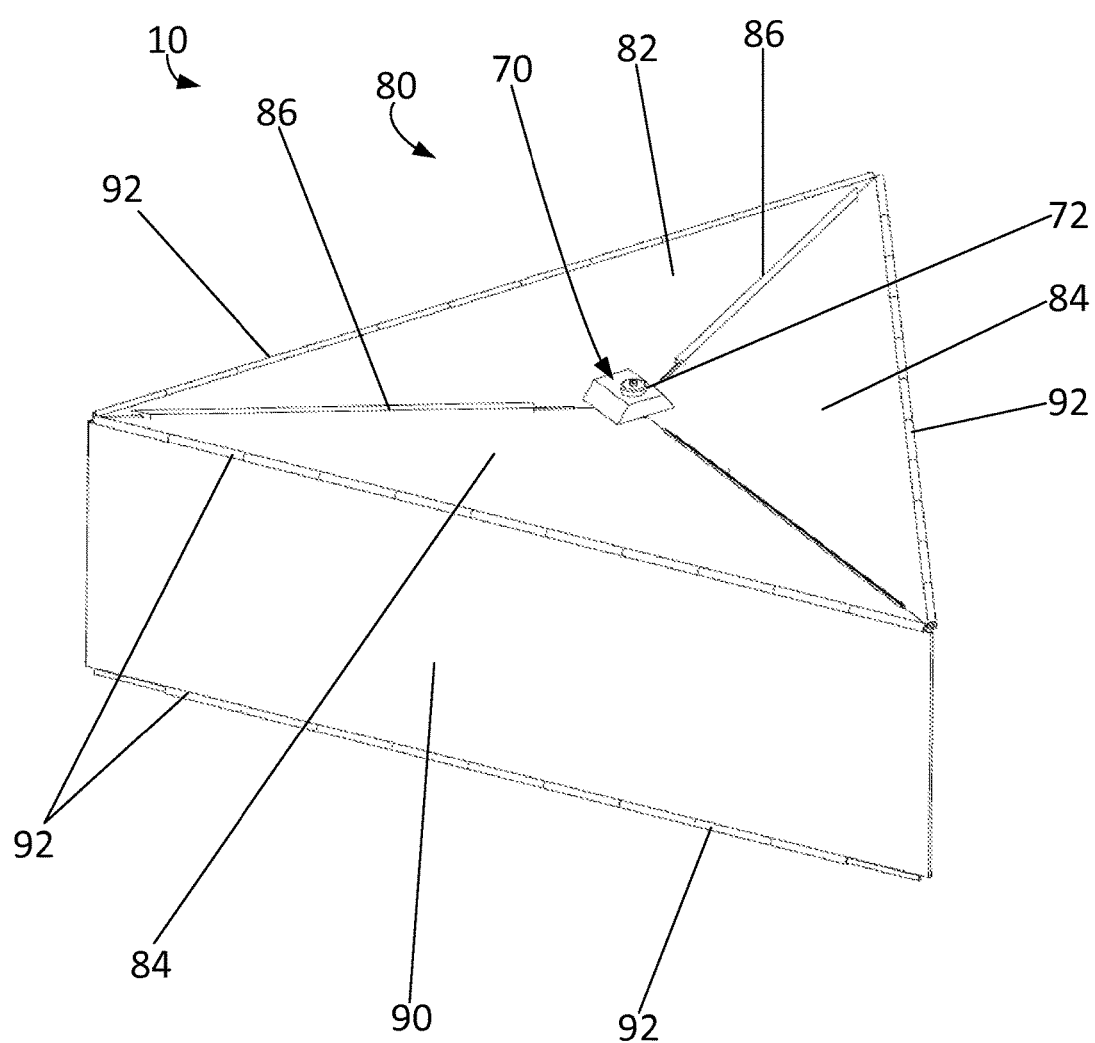
FIG. 3C is another perspective view of the exemplary system of FIG. 3A.
Figure 3D:
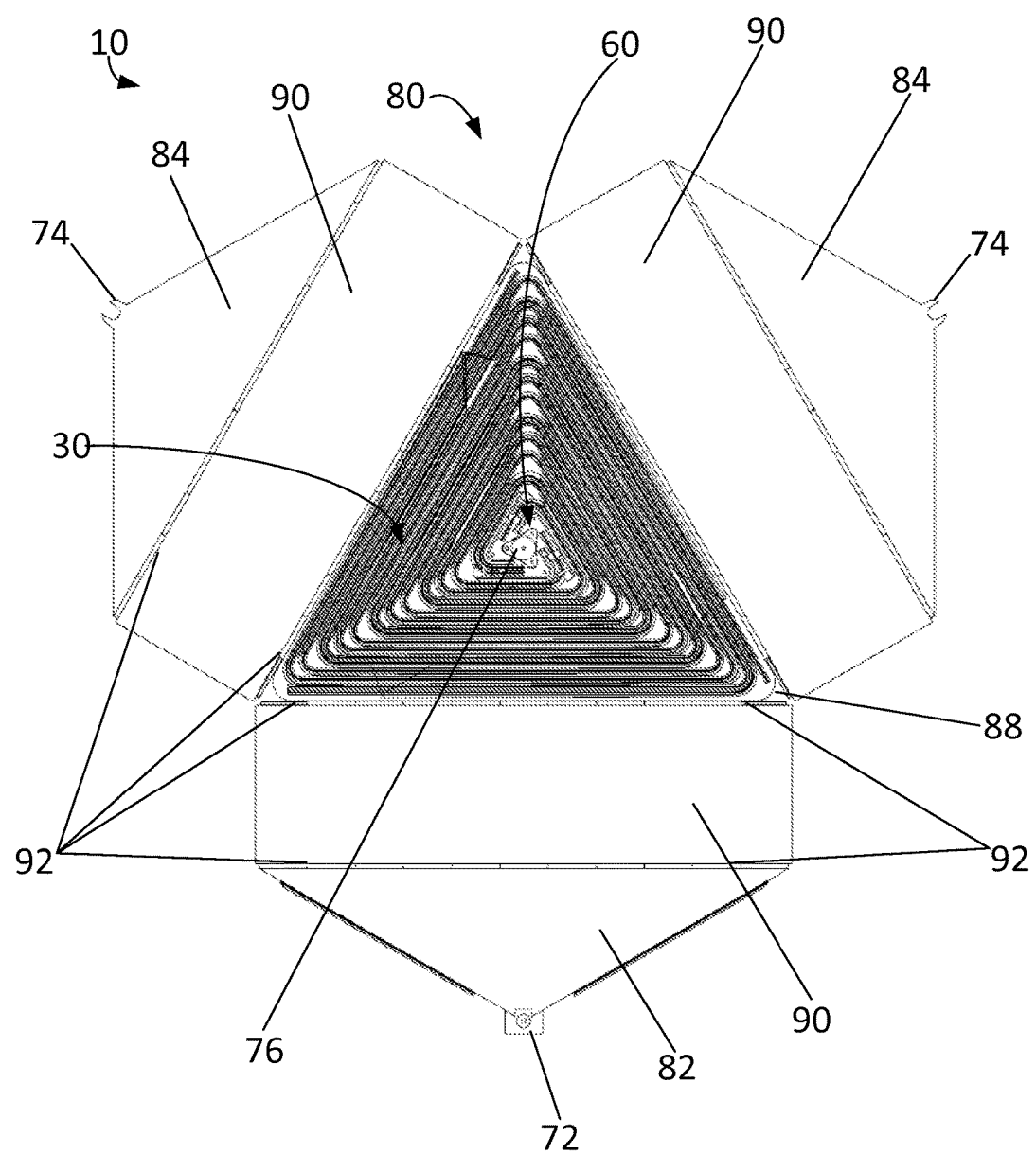
FIG. 3D is a top, plan view of the exemplary system of FIG. 1 including the storage apparatus in a released configuration and the deployable gossamer apparatus in a stowed configuration.

As described herein, the storage apparatus 80 of the exemplary system 10 may be configured in at least the storage configuration as shown in FIGS. 3A and 3C and the released configuration as shown in FIG. 3D. When the deployable gossamer apparatus 30 is in the stowed configuration, the rib members 40 and gossamer material 51 are wrapped around the central mount portion 60 as shown in FIG. 3B and may be contained, or enclosed, wholly or partially within the storage apparatus. The rib members 40 and gossamer material 51 may be held (e.g., restricted or restrained) in the stowed configuration by storage apparatus 80 when the storage apparatus 80 is configured in the storage configuration as shown in FIGS. 3A and 3C. More specifically, the wall portions (e.g., panels or other suitable surface, enclosure or cover pieces) such as that side wall portions 90, top wall portions 82, 84, and back wall portion 88 of the storage apparatus 80 may prevent deployment of the deployable gossamer apparatus 30 from the stowed configuration. For example, the wall portions may restrict movement (e.g., unwinding, unfurling, movement out of the storage plane, etc.) of the rib members 40. More specifically, as described herein, the rib members 40 may be biased, or predisposed, to extend along their respective rib axes 41', 41", 41''' and the wall portions of the storage apparatus 80 may not allow the rib members 40 (may restrict rib members 40) from moving to extend along their respective rib axes 41', 41", 41'''. As such, the potential energy stored by the rib members 40 when in the stowed configuration may be restricted, or stopped, from being released, by the storage apparatus 80.

Although the storage apparatus 80 depicted herein includes a plurality of wall portions to restrict or stop the deployable gossamer apparatus 30 from deploying to the deployed configuration, it is to be understood that the storage apparatus 80 may include, or utilize, any portion or member arranged in any configuration to restrict or stop the deployable gossamer apparatus 30 from deploying to the deployed configuration.

To release the storage apparatus 80 from the storage configuration to the released configuration, and in turn, release the deployable gossamer apparatus from the stowed configuration to the deployed configuration, the exemplary system 10 may further include actuation apparatus 70 that configured to restrict or hold the storage apparatus 80 in the storage configuration. When the deployable gossamer apparatus 30 is to be deployed, the actuation apparatus 70 may release the storage apparatus 80 from the storage configuration as shown in FIG. 3B. When the storage apparatus 80 is released from the storage configuration, the wall portions 82, 84, 90 may unfold releasing and exposing the deployable gossamer apparatus 30 so as to allow the deployable gossamer apparatus 30 to expand (e.g., move, be configured, transform, expand, change) into the deployed configuration as shown in FIGS. 2A-2C.

In other words, the wall portions 82, 84, 90 (and in some embodiments, back wall portion 88) cover and contain the deployable gossamer apparatus 30, and the actuation apparatus 70 holds the storage apparatus 80 in the storage configuration until released by operation of the actuation apparatus 70 into the released configuration. When released, the storage apparatus 80 can transition into the released configuration.

Although three top wall portions 82, 84 are used in this embodiment, any number of top wall portions 82, 84 may be provided such as, e.g., one or more top wall portions, two or more top wall portions, three or more top wall portions, four or more top wall portions, etc. In this embodiment, one top wall portion 82 may be referred to as the restraining top wall portion 82, and the other two top wall portions 84 may be referred to as the restrained top wall portions 84 because the restraining top wall portion 82 may overlap the retrained top wall portions 84 to restrict movement of the restrained top wall portions 84 when in the storage configuration. In essence, the top wall portions 82, 84 (e.g., panels, enclosure or cover pieces, etc.) may serve either a restraining function (e.g., configured to restrain another top wall portion) or may be restrained by another top wall portion (e.g., configured to be restrained by another top wall portion). As shown, the restraining top wall portion 82 retrains the other two top wall portions 84.

More specifically, the restraining top wall portion 82 may include one or more overlap regions 86 (e.g., ridges) configured to overlap corresponding regions 87 (e.g., edges, ridges, etc.) of the restrained top wall portions 84 to restrict, or restrain, movement of the restrained top wall portions 84 (e.g., such that the restrained top wall portions 84 are "held down" by the restraining top wall portion 82). In this embodiment, all of the top wall portions 82, 84 may be restricted or restrained from movement (e.g., held closed in the storage configuration) by the actuation apparatus 70, which will be described further herein within respect to the actuation apparatus 70. Further, the overlap regions 86, 87 may be configured to prevent unintentional deployment or shifting of the wall portions 82, 84, 90 during exposure to high-g forces or extreme vibrational environments. The overlap regions 86, 87 (e.g., using grooves, ridges, etc.) may provide a simplified interface between the top wall portions 82, 84 and the actuation apparatus 70 because only one top wall portion 82 directly interfaces with the actuation apparatus 70 for releasing the entire storage apparatus 80.

As shown in FIGS. 3A-3D, each side wall portion 90 and top wall portions 82, 84 may be pivotally coupled together, e.g., by hinges 92 (e.g., piano hinges, living hinges, or any other suitable hinges). In one or more embodiments, the hinges 92 may include a piano hinge with a metallic or polymeric pin, polymeric spacers (e.g., DELRIN), and metallic, polymeric, or a composite barrel. The hinges 92 may be integrated into the wall portions 82, 84, 90, with the barrel formed of the same piece of material, or it may be fastened (bolt, adhesive, etc.) to the wall portions 82, 84, 90 and may be made of a different material. Additional hinges 92 may pivotally connect side wall portions 90 to either the spacecraft structure or the storage apparatus back wall portion 88, if present. In at least one embodiment, a single hinge and pin may be located along the length of the side portion(s) 90, while in another embodiment there may be a plurality of co-linear hinges.

As described, the actuation apparatus 70 may be configured to restrict, and subsequently release, the storage apparatus 80 from the storage configuration. In the particular embodiments depicted in FIGS. 1-3, the actuation apparatus 70 is configured to restrict, and subsequently, release the restraining top wall portion 82, which as described herein, release the other wall portions 84, 90. The actuation apparatus 70 may include a first portion 72 and a second portion 76. The first portion 72 of actuation apparatus 70 may be fastened to or integrated within the restraining top wall portion 82. The restrained top wall portions 84 may each define a restraining tab 74 (e.g., a u-shaped, c-shaped, or otherwise shaped tab or mechanism) that may be configured to interface partially around a portion of the actuation apparatus 70 (e.g., release mechanism). The restraining tabs 74 may be configured to help, prevent, reduce, and/or limit movement of the restrained top wall portions 84 (e.g., in high-g and vibrational environments by preventing motion of the wall portions 82, 84, 90).

The second portion 76 of the actuation apparatus 70 (e.g., an actuator) may be coupled (e.g., mounted) to the storage apparatus 80 (e.g., to the back wall portion) and/or the central mount portion 60. The second portion 76 may be selectively coupled to the first portion 72 such that when the second and first portions 76, 72 are coupled together, the actuation apparatus 70 may be configured to restrict the storage apparatus 80 in the storage configuration. Likewise, when the first and second portions 72, 76 are uncoupled, the actuation apparatus 70 may release the storage apparatus 80 from the storage configuration to the released configuration.

Figure 6:
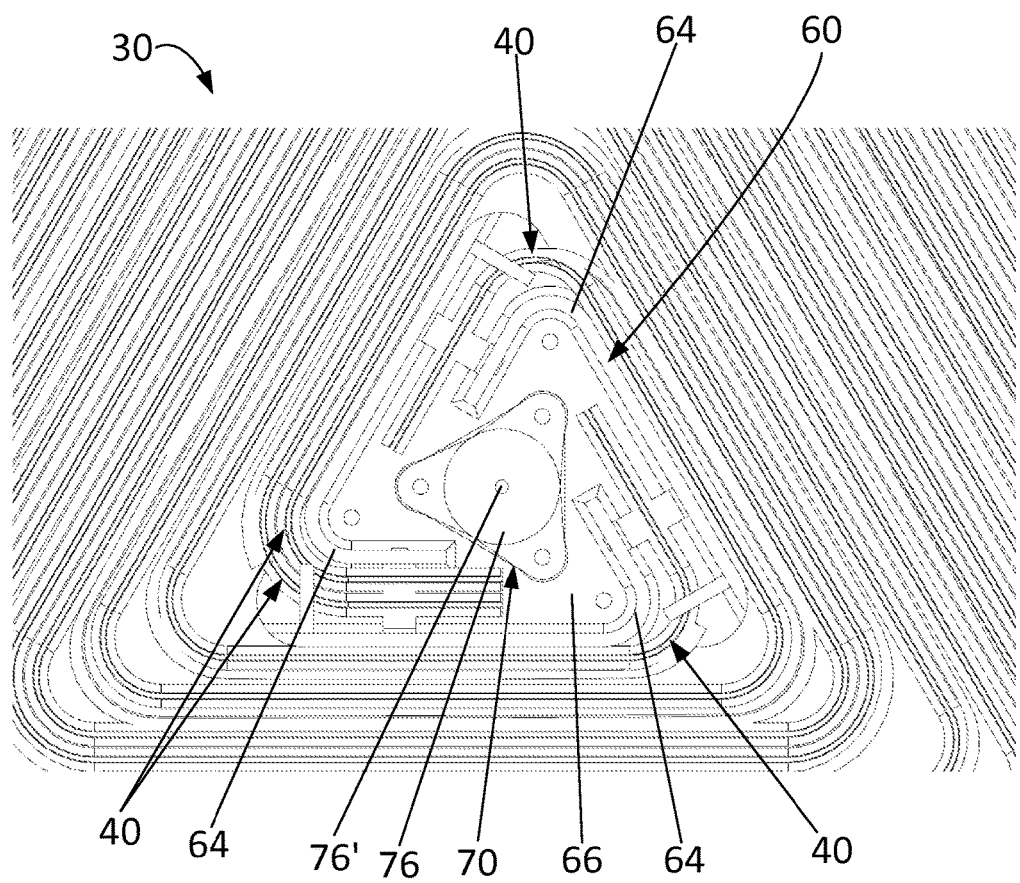
FIG. 6 is a close-up, top view of a central region of the deployable gossamer apparatus of FIG. 3D with the deployable gossamer apparatus in the stowed configuration.

In the embodiment depicted in FIGS. 6-7, the second portion 76 of the actuation apparatus 70 may be shape-memory alloy actuator. For example, the actuator may include an actuator pin 76' extending from the top towards the storage apparatus 80 that interfaces with the first portion 72 of the actuation apparatus 70 (e.g., a release nut or other suitable release mechanism) that is integrated into the restraining top portion 82 (or any other suitable component) of the storage apparatus 80. In some embodiments, before actuation, the first portion 72 may be held in place on a pin 76' on top of the second portion 76 (e.g., shape memory alloy actuator) by a latch mechanism that is held by second portion 76. The first portion 72 may be, for example, a release nut, and the second portion 76 may be, for example, a shape memory alloy actuator. When actuated by an applied voltage, the second portion 76 (e.g., shape memory alloy actuator) may release the first portion 72 (e.g., release nut), at which point the first portion 72 release the second portion 76 (e.g., the second portion 76 may slide off actuator pin 76'). In at least one embodiment, the second portion 76 may be propelled away from, or off of, the actuator pin 76' by a spring that may be configured to provide an initial push to separate the first portion 72 from the second portion 76 immediately after actuation.

The gossamer apparatus 30 is shown in the stowed configuration while the storage apparatus 80 is deploying into the released configuration in FIG. 3B. After the actuation apparatus 70 is released, the storage apparatus 80 may transition (e.g., open) to a released configuration. The energy to open the storage apparatus 80 may come from potential energy that is stored in the storage apparatus 80. In at least one embodiment, the energy may be supplied by torsional springs in the hinges 92 or near the hinges 92 that are compressed (e.g., storing potential energy) when the storage apparatus 80 is in the storage configuration and are at a lower energy state (e.g., extended state) when the storage apparatus 80 is in the released configuration. Any suitable mechanism configured to provide potential energy at or near the hinge 92 location may be provided. Thus, the wall portions 82, 84, 90 may be configured to open without any external motors or other devices.

Figure 4A:
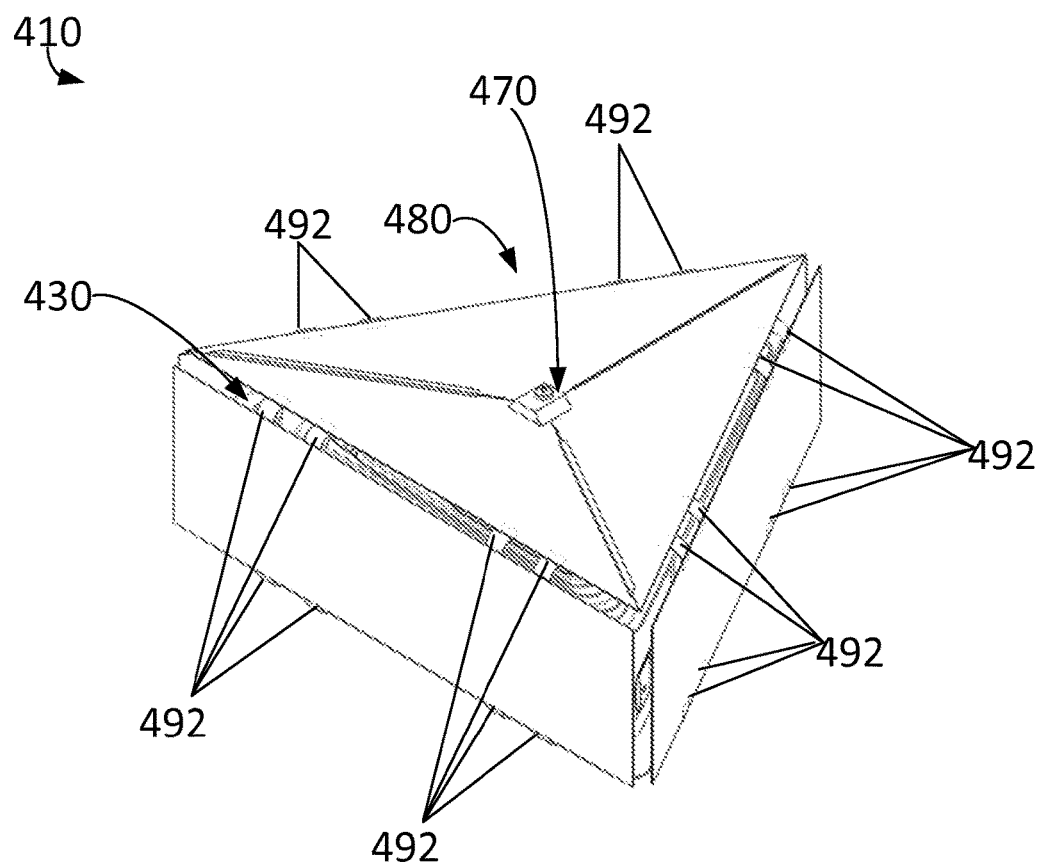
FIG. 4A is a perspective view of another exemplary system for increasing the surface area of a spacecraft.
Figure 4B:
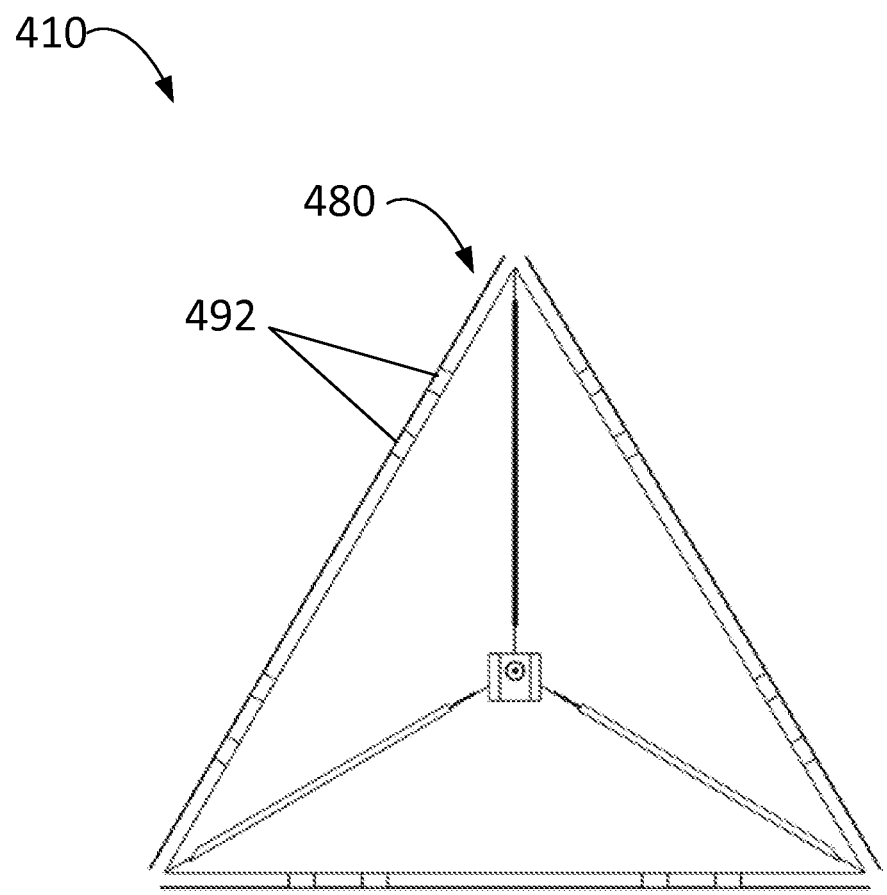
FIG. 4B is a top, plan view of the exemplary system of FIG. 4A.
Figure 4C:
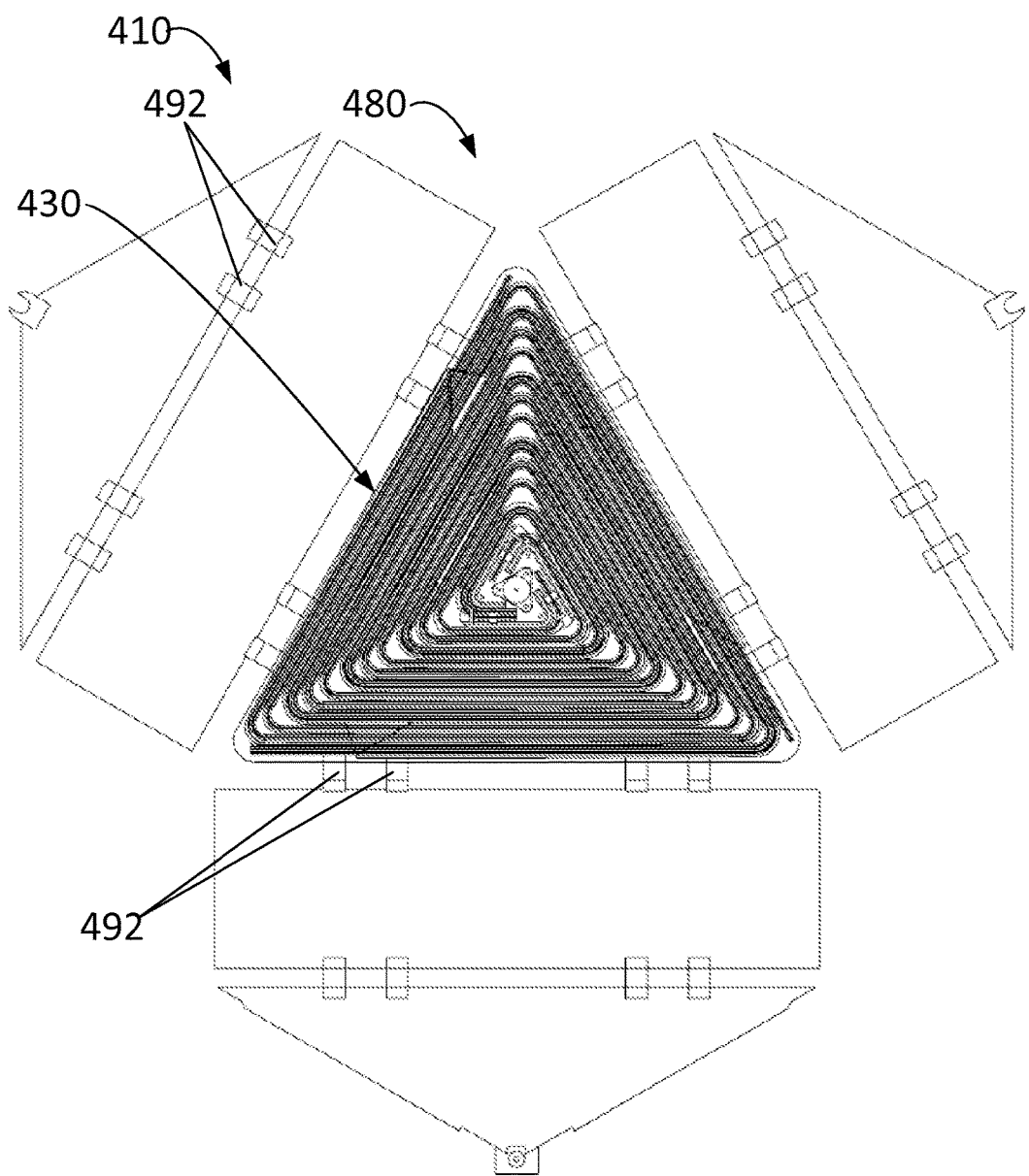
FIG. 4C is a top, plan view of the exemplary system of FIG. 4A including the storage apparatus in a released configuration and a deployable gossamer apparatus in a stowed configuration.

Another exemplary system 410 for increasing the surface area of a spacecraft is depicted in FIGS. 4A-4C. The exemplary system 410 includes storage apparatus 480 that is different than the storage apparatus 80 described herein with reference to FIGS. 1-3. In this embodiment, the hinges 492 of the storage apparatus 480 are springs (e.g., lenticular springs or any other type of spring) that are configured to store potential energy when bent but naturally straighten when unrestrained. As such, when actuation apparatus 470 releases the storage apparatus 480 from the storage configuration, the hinges 492 may release the stored potential energy to transition the storage apparatus 480 from the storage configuration as shown in FIG. 4A to the released configuration as shown in FIG. 4C. As shown in FIG. 4A, the deployable gossamer apparatus 430 may not be fully enclosed (e.g., at least a portion of the deployable gossamer apparatus 430 may be visible, exposed, and/or unprotected) and the total mass of the system 410 may be reduced.

As shown in FIG. 3B, the side wall portions 90 may be selected to have a height to accommodate the height of the stowed deployable gossamer apparatus 30, and wide enough (e.g., from one end to the other end along the storage plane 36) to allow the stowed deployable gossamer apparatus 30 to be located in the storage plane 36. Further, the top wall portions 82, 84 may be configured to cover at least enough area in the storage plane 36 so that, when taken in combination, the plurality of top wall portions 82, 84 may completely enclose the deployable gossamer apparatus 30 when in the stowed configuration. In another embodiment, the wall portions 82, 84, 90 may leave openings in the storage apparatus 80 and not completely enclose the deployable gossamer apparatus 30. In some embodiments, the wall portions 82, 84, 90 may be selected and sized to be large enough to restrain the deployable gossamer apparatus 30 in the stowed configuration but to not completely enclose the deployable gossamer apparatus 30 (e.g., not necessarily protect the deployable gossamer apparatus 30 from the surrounding environment).

Further, the maximum width of the folded deployable gossamer apparatus 30 may influence the height of the side wall portions 90. The general shape of the deployable gossamer apparatus 30 may be configured such that each gossamer material 51 may be folded and wrapped between two adjacent rib members 40. Due to the gossamer material 51 being wider at the distal end portions 44 of the rib members 40 than at the proximal end portions 42 of the rib members 40, the deployable gossamer apparatus 30 may increases in width/height as the deployable gossamer apparatus 30 wraps from the central mount portion 60 to the distal end portions 44 of the rib members 40. In other words, an outer region of 39 of the deployable gossamer apparatus 30, when in the stowed configuration, may be taller (e.g., have greater height) and may be thicker (e.g., due to more material) than an inner region 37 as shown in FIG. 3B. As such, a maximum width of the deployable gossamer apparatus 30 may determine the height of the side wall portions 90 of the storage apparatus 80.

The deployable gossamer apparatus 30 may deploy (e.g., transition from the stowed configuration to the deployed configuration) simultaneously, or nearly simultaneously within the storage apparatus 80, when the storage apparatus 80 moves from the storage configuration to the released configuration. For example, the actuation apparatus 70 may essentially be the only mechanism restraining the deployable gossamer apparatus 30 from deploying. When the storage apparatus 80 is in the released configured, the storage apparatus 80 may be configured so that it does not interfere with the position or configuration of the deployable gossamer apparatus 30. In other embodiments, the storage apparatus 80 may interfere with the deployment of the deployable gossamer apparatus 30, so that storage apparatus 80 may facilitate a desired deployment trajectory (e.g., provide a reaction surface for the deployable gossamer apparatus 30, or a portion of the structure to react against in order to guide the direction, speed or dynamics of the deployment).

In one or more embodiments, the storage apparatus 80 may be shaped like a triangular prism. However, in other embodiments the storage apparatus 80 may be shaped like a circle, ring, hexagon, octagon, parallelogram, a random or irregular shape, or any other suitable shape.

Figure 5A:
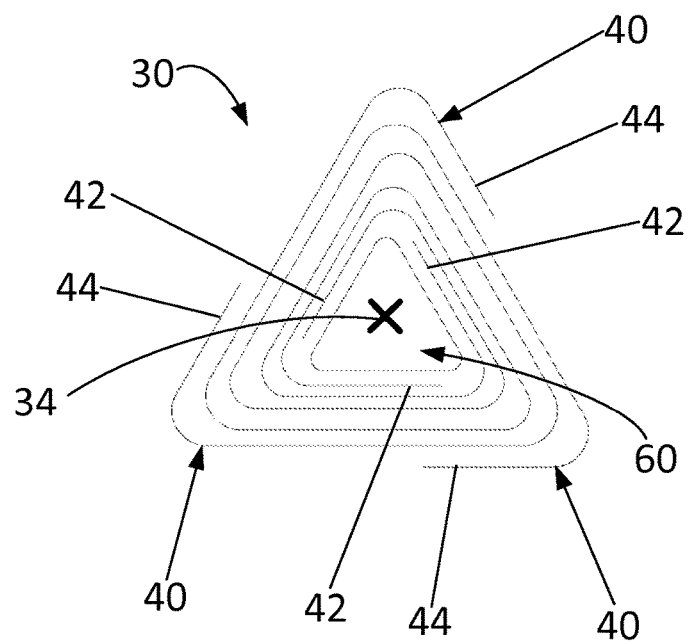
FIGS. 5A-5C are successive top, plan views of a diagrammatic representation of rib members of an exemplary deployable gossamer apparatus transitioning from a stowed configuration to a deployed configuration.
Figure 5B:
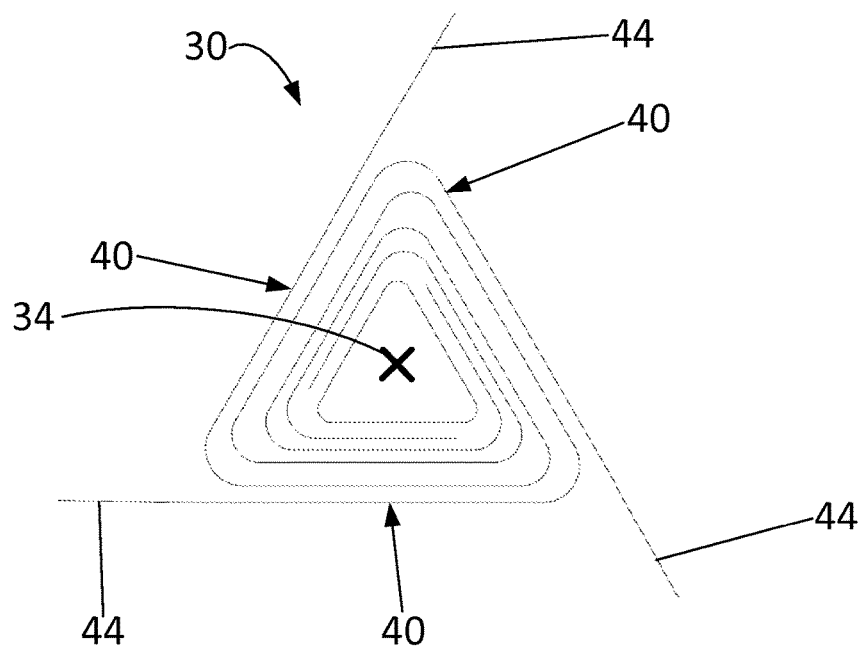
Figure 5C:
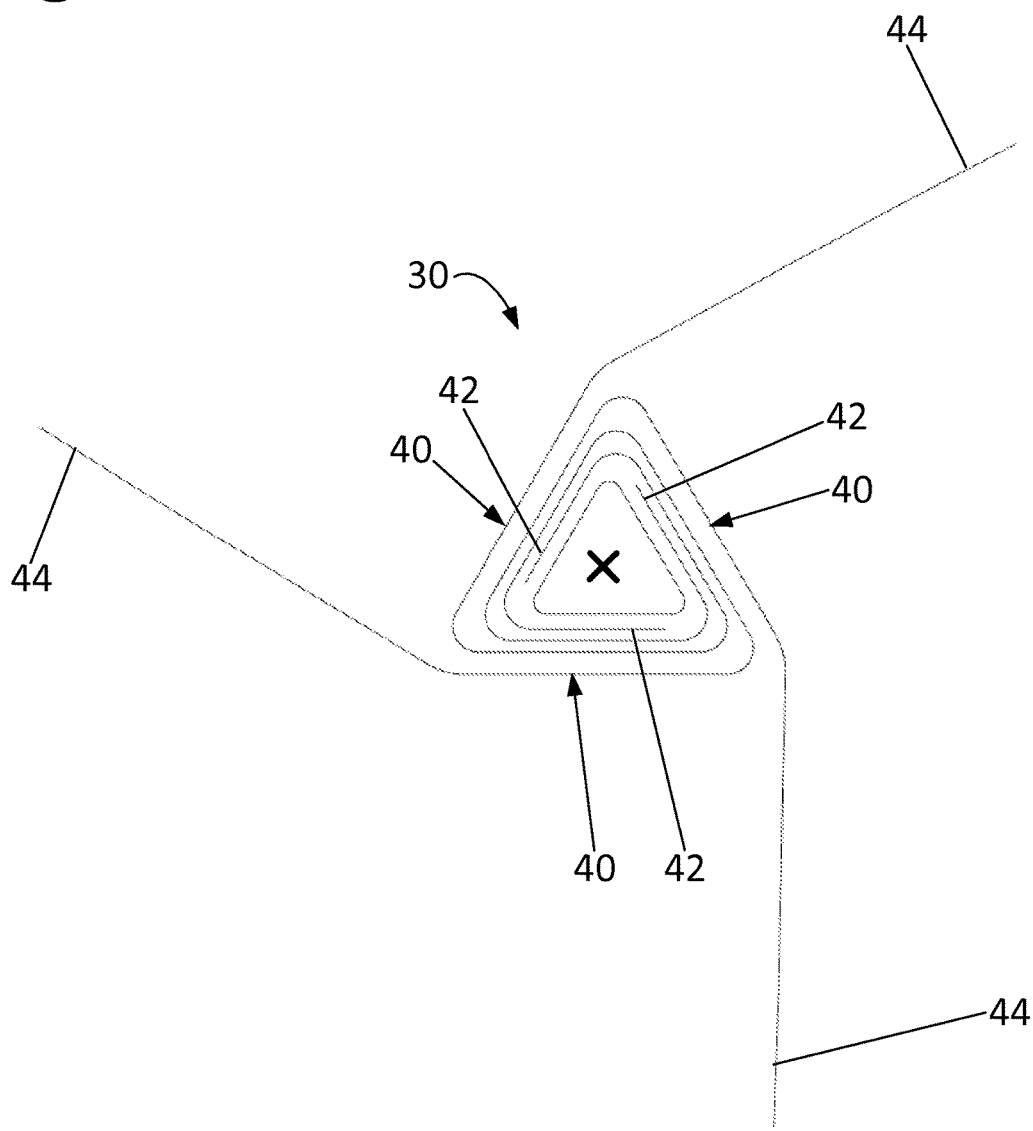

Diagrammatic representations of exemplary rib members 40 deploying while the deployable gossamer apparatus 30 is transitioning from the stowed configuration to the deployed configuration are depicted in FIGS. 5A-5C. For example, the deployable gossamer apparatus 30 may be wrapped around a central mount portion 60 to collapse the deployable gossamer apparatus 30 from the deployed configuration to the stowed configuration as shown in FIG. 5A. In one or more embodiments, it may be described that the gossamer material 51 and rib members 40 may be folded like a Chinese fan (e.g., a flattened accordion fold). As shown, the central mount portion 60 is triangular and the deployable gossamer apparatus 30 is wrapped around the central mount portion 60 in a triangular path around the central axis 34 (e.g., may be a central axis which extends through the central portion 60). The deployment process of the rib members 40 is depicted in FIGS. 5B-5C. As shown, the distal end portion 44 may rotated around the center mount portion 60 and central axis 34 in a counterclockwise direction.

Figure 7A:
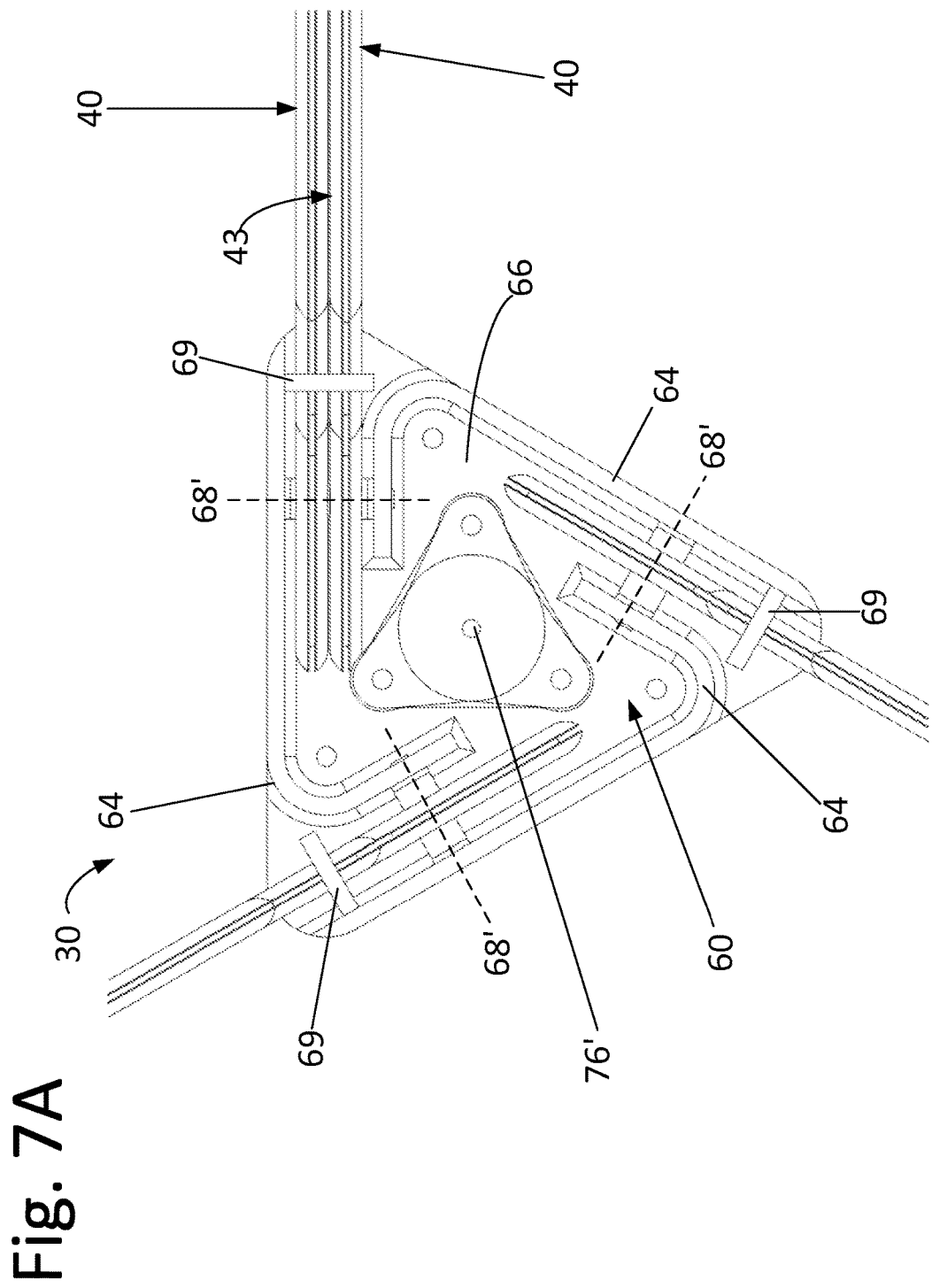
FIG. 7A is a close-up, top view of a central region of the deployable gossamer apparatus of FIG. 3D with the deployable gossamer apparatus in a deployed configuration.
Figure 7B:
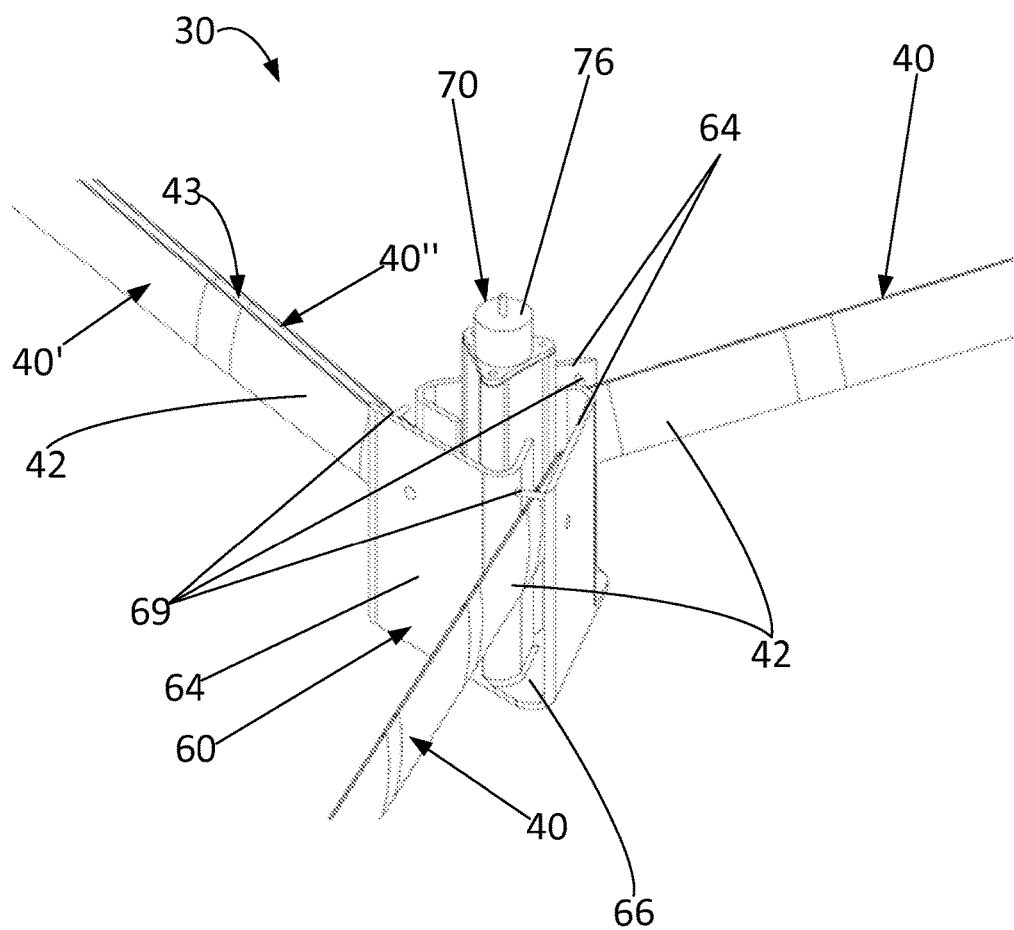
FIG. 7B is a close-up, perspective view of the central region of the deployable gossamer apparatus of FIG. 7A.

The deployable gossamer apparatus 30 wrapped about a triangular central mount portion 60 is shown in further detail in FIGS. 6 and 7A-7B. The gossamer material 51 is depicted being folded up with the rib members 40 about the central mount portion 60. The gossamer material 51 may be bonded (e.g., vibration welding, adhesive, mechanical fasteners, etc.) to the rib members 40. The gossamer material 51 may be bonded on either side of each rib member 40.

As shown, two rib members 40', 40" may be located in close proximity (e.g., adjacent one another) to each other (e.g., parallel, co-linear, co-extensive, co-axial, extending along adjacent paths) without gossamer material 51 extending therebetween. Instead, gossamer material 51 may only extend from the opposing sides of the two rib members 40', 40". A gap 43 may be defined between the two rib members 40', 40" to allow the rib members 40', 40" to be wrapped around the central mount portion 60 when in the stowed configuration. In other words, the rib members 40', 40" arrangement may provide a split in an otherwise continuous deployable gossamer apparatus 30 that allows the two adjacent rib members 40', 40" to slide past each other when being folded (when the deployable gossamer apparatus 30 is transitioned into the stowed configuration from the deployed configuration). The gap, or split, 43 may prevent ripping of the gossamer material 51 during packing and deployment. In other embodiments, the deployable gossamer apparatus 30 may include two rib members 40 for each gossamer portion 50, allowing each to fold independently of the others, or only one rib member 40 per gossamer portion, which may require that all the gossamer portions 50 fold and unfold simultaneously.

As shown in FIGS. 6 and 7A-7B, the central mount portion 60 may include a base structure 66 and a plurality of geometric protrusions 64 coupled to the base structure 66. The geometric protrusions 64 may be configured to provide a guiding surface about which the rib members 40 may be wrapped around. The geometric protrusions 64 may be shaped in any suitable manner for wrapping (e.g., packing, folding, or otherwise stowing) rib members 40 and gossamer material 51 about the central mount portion 60. Additionally the geometric protrusions 64 may facilitate wrapping about the central mount portion 60 along a circular, triangular, square, hexagonal, or irregular orientation or facilitate wrapping in any other suitable manner. The central mount portion 60 may include any suitable number of geometric protrusions 64 in order to facilitate wrapping such as, e.g., one or more geometric protrusions, two or more geometric protrusions, three or more geometric protrusions, four or more geometric protrusions, etc.

The plurality of rib members 40 may be rotatably coupled to the geometric protrusions 64 about a coupling axes 68', 68", 68''' that may be perpendicular to the central axis 34. The rib member 40 may be attached to the geometric protrusions 64 using any suitable coupling means that provides rotation, or pivotable motion, about the coupling axes 68', 68", 68'''. As shown, pins are used to couple the rib members 40 to the geometric protrusions 64. The rib members 40 may be configured (e.g., by the rotatable coupling with the geometric protrusions 64) to rotate out of the original or storage plane 36 and up into the shuttlecock configuration in an out-of-plane orientation as described herein with references to FIGS. 2A-2C. To restrict rotation about the coupling axes 68', 68", 68''', the central mount portion 60 may further include rotation restriction bars 69 positioned so that they define a maximum angle α out of the storage plane 36 that the rib members 40 can move as shown in FIG. 7B. More specifically, the rotation restriction bars 69 may contact, or abut, the rib members 40 stopping the rib members 40 from rotating any more out of the storage plane.

Figure 8:
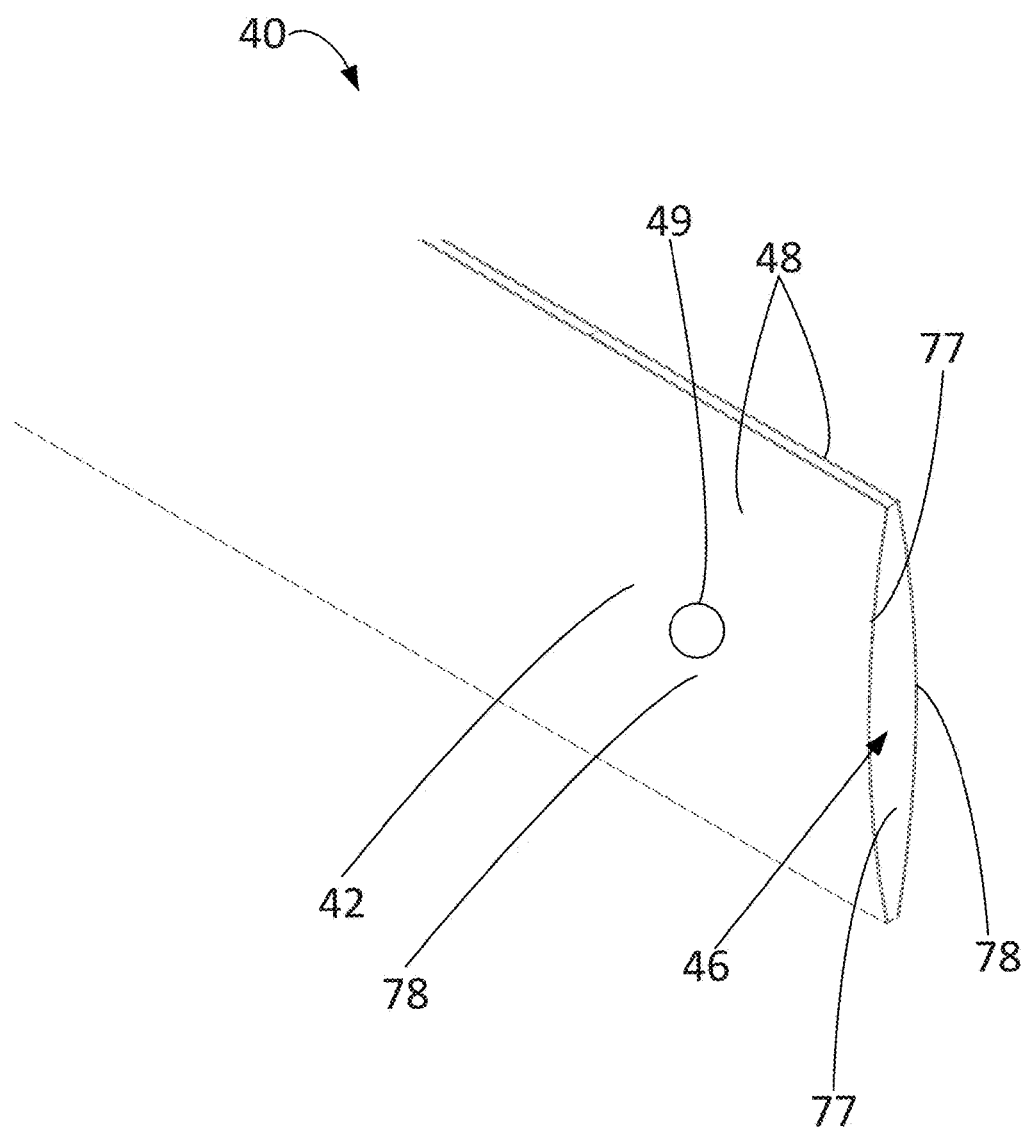
FIG. 8 is a close-up, perspective view of an end portion of a rib member of the exemplary deployable gossamer apparatus of FIGS. 7A-7B.

A proximal end portion 42 of an exemplary rib member 40 is depicted in FIG. 8. As shown, the rib member 40 may include two lenticular springs 48. As shown in this embodiment, each of the two lenticular springs 48 may define a concave surface 77 and a convex surface 78. In the embodiment shown, the two lenticular springs 48 may be opposed to each other. In other words, the two lenticular springs 48 may be positioned such that the concave surfaces 77 face each other. In other embodiments, the two lenticular springs 48 may be positioned such that the concave surfaces 77 face away from each other (and the convex surfaces 78 face each other). In some embodiments, one or more spacers may be located between the two opposed lenticular springs 48 at one or more locations along the rib members 40. The two lenticular spring 48 configuration may provide structural stiffness to the rib member 40 in its deployed configuration. Further, a hole 49 (e.g., an opening or any other suitable attachment feature) may be defined through each of the lenticular springs 48 that may be used to rotatably couple the rib member 40 to the central mount portion 60 using, e.g., a pin. As shown, the holes 49 are located at, or near, the proximal end portion 47 of the rib member 40.

Although a particular orientation of the lenticular springs 48 is disclosed in this embodiment, other embodiments of rib member 40 may include a different orientation of the lenticular springs 48 such as those described herein with reference to FIGS. 11A-11H.

The plurality of rib members 40 may be configured to store potential energy when the deployable gossamer apparatus 30 is configured in the stowed configuration. The stored potential energy of the plurality of rib members 40 may provide the movement of the deployable gossamer apparatus 30 from the stowed configuration to the deployed configuration when the storage apparatus 80 releases the deployable gossamer apparatus 30. More specifically, the lenticular springs 48 of the rib members 40 may store the potential energy and, when released, generate forces to straighten the rib members 40 to extend along a rib axis (e.g., the way a carpenter's tape naturally straightens itself out). When bent, or wrapped about the central mount portion 60, the lenticular springs 48 may store potential energy, which may be subsequently spent to straighten out the lenticular springs 48 during the transition from the stowed configuration, or state, to the deployed configuration, or state. The lenticular springs 48 may be selected and/or configured so as to generate a sufficient force for deploying the deployable gossamer apparatus 30 (e.g., to deploy the deployable gossamer apparatus 30 in a passive manner based on the rib members 40 own potential energy, without the aid or addition of energy from other components such as a motor).

In another embodiment, the velocity generated by the lenticular springs 48 may be higher than required for deployment. In this embodiment, a damping device may be used to dampen the motion of the rib members 40 as they deploy, preventing them from moving too quickly. The damping may come from a passive or active damping device. Passive damping may include wrinkles in the gossamer material of the gossamer portions 50, passive damping provided by spacer material 46 installed between the two lenticular springs 48 as shown in FIG. 8 and/or from a rotary or linearly viscous damper.

The exemplary system 10 for increasing the surface area of a spacecraft 20 may also be configured to achieve stability in the shuttlecock formation when the deployable gossamer apparatus 30 is in the deployed configuration. The aerodynamic forces on the deployed sail 54 (e.g., the gossamer portions 50 as supported by the rib members 40 when the deployable gossamer apparatus 30 is in the deployed configuration) may be configured to provide a force-moment, and the damping device may be configured to dampen any oscillations such that the exemplary system 10 and/or spacecraft 20 could achieve stability. Additionally, if the spacecraft 20 already has a passive damping device, the exemplary system 10 may be configured to utilize the already provided damping device to provide damping. Passive damping may also be provided using a passive damping device such as magnetic hysteresis rods. The hysteresis rods are for damping the attitude change of the spacecraft that may result from aerodynamic forces once the device is deployed.

Figure 9A:
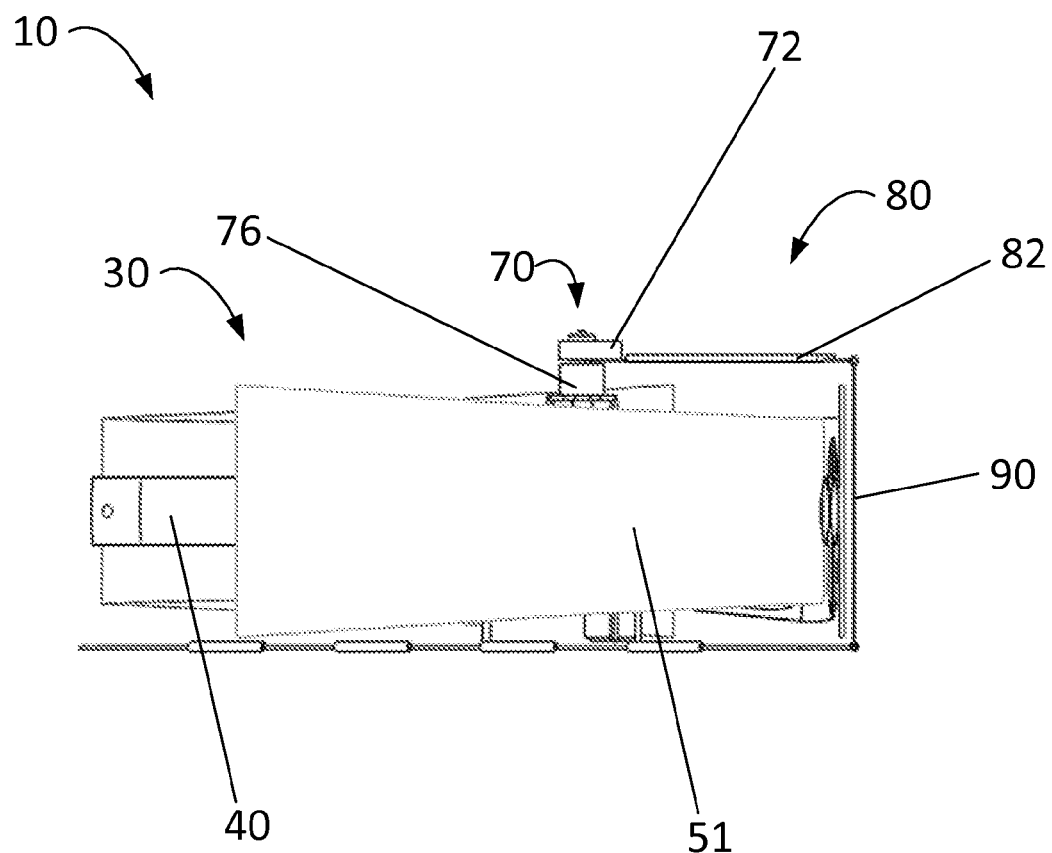
FIG. 9A is a side, elevation view of the exemplary system of FIG. 1 including the storage apparatus in a storage configuration.
Figure 9B:
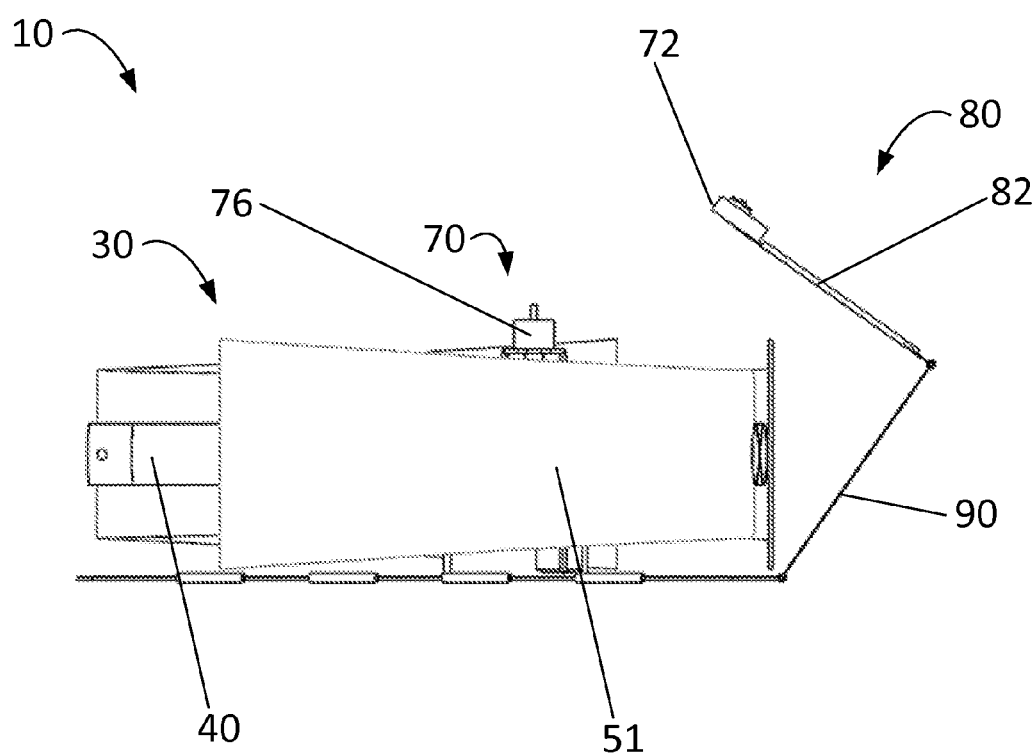
FIG. 9B is a side, elevation view of FIG. 9A with the storage apparatus transitioning from the storage configuration to a released configuration.

A side, elevation view of the exemplary system 10 including storage apparatus 80 in a storage configuration and actuation apparatus 70 is depicted in FIG. 9A and a side, elevation view of the exemplary system 10 with the storage apparatus 80 transitioning from the storage configuration to a released configuration is depicted in FIG. 9B. Only one of three of groups of wall portions 82, 88, 90 of the storage apparatus 80 is shown for clarity. As shown, as the second portion 76 of the actuation apparatus 70 decouples, or disengages, from the first portion 72 of the actuation apparatus 70, the wall portions 82, 90 may move away from the central mount portion 60 when the storage apparatus 80 transitions from the storage configuration to released configuration. As shown, the storage apparatus 80 may begin to unfold immediately after the actuation apparatus 70 (e.g., first portion 72 and second portion 76) is actuated. Further, as the pressure, or restriction, on the stowed deployable gossamer apparatus 30 is released and the side wall portions 90 of the storage apparatus 80 move away, the deployable gossamer apparatus 30 may also begin to deploy.

The exemplary system 10 may be configured to interface with the spacecraft's computer system. The interface may be used to transmit (send/receive) a signal that deploys the exemplary system 10. One method for sending a deploy signal may be a single I/O command to a drive circuit.

Another exemplary method of deployment may be to inhibit deployment until a watchdog timer expires, or runs out. For example, the spacecraft may periodically (e.g., once a day, once an hour, etc.) send a command to reset a watchdog timer within the electronics of the exemplary system 10. The nature of the timer may be such that when it expires, the timer may connect the circuit that provides the electrical energy used to actuate the actuation apparatus 70 and effect/cause the deployment of the deployable gossamer apparatus 30. The watchdog timer may be configured to continuously listen for a signal from the spacecraft computer. The signal from the spacecraft computer, when received by the watchdog timer, may reset the timer, preventing the deployment of the deployable gossamer apparatus 30. The signal maybe sent by the spacecraft computer to the watchdog timer regularly on an interval significantly shorter than the duration of the timer. Further, the timer may be have a time period that is long enough to prevent accidental activation of the actuation apparatus 70 in the case of a computer restart or planned spacecraft shut-down time. The use of the watchdog timer and the deployment signal may ensure that the deployable gossamer apparatus 30 can deploy at the end of a satellite's life (e.g., when the spacecraft computer of the satellite may have stopped functioning). In the case of a computer failure and unexpected end of the spacecraft's useful life, the timer may expire (e.g., since the time will not receive a reset signal from the failed computer) and the deployable gossamer apparatus 30 will deploy, safely deorbiting the spacecraft.

In at least one embodiment, the exemplary system 10 may supply its own power source by means of a primary battery, batteries, solar cells, or any other energy storage device. In at least one other embodiment, the exemplary system 10 may be supplied power by the spacecraft's 20 power system.

In at least one other embodiment, the only interface between the exemplary system 10 may be structural. In this case, the exemplary system 10 may include an internal timer and battery. Before launch, the timer may be configured, or set, to connect a battery to provide power to the actuation apparatus 70 after a selected period of time has elapsed or upon a certain date and time, which may ensure that the spacecraft 20 may deorbit at a later time (e.g., to prevent an extension of the mission or early disposal of the spacecraft 20 in the case of an early end of the spacecraft's life).

In at least one embodiment, the structural interface between any portion of the exemplary system 10 (e.g., the deployable gossamer apparatus 30 and/or the storage apparatus 80) and the spacecraft 20 may be considered permanent (e.g., where the interface is not designed to be severed). In at least one other embodiment, the structural interface between any portion of the exemplary system 10 and the spacecraft 20 may be considered to be temporary, where the interface may be designed such that it can be separated at a specified time or may be designed such that it can be separated at any time. In other words, any portion of the exemplary system 10, whether structural or communicative, may be removably coupled to (decouplable from) the spacecraft 20.

The spacecraft 20 may include a separation system. The separation system may include pyrotechnically severed fasteners, a latch device or devices, or any other fastening device that can be released. A separation event may be initiated by the spacecraft 20 and may require no action (e.g., command, input) by the deployable gossamer apparatus 30 and/or the storage apparatus 80. Such a command could originate in the spacecraft's computer logic, or could originate as a command from the ground. Further, a separation event may be initiated by the exemplary system 10 and may require no action by the spacecraft 20. Still further, a separation event may be initiated by either the spacecraft 20 or the exemplary apparatus 10 and may be executed by either.

Figure 10A:
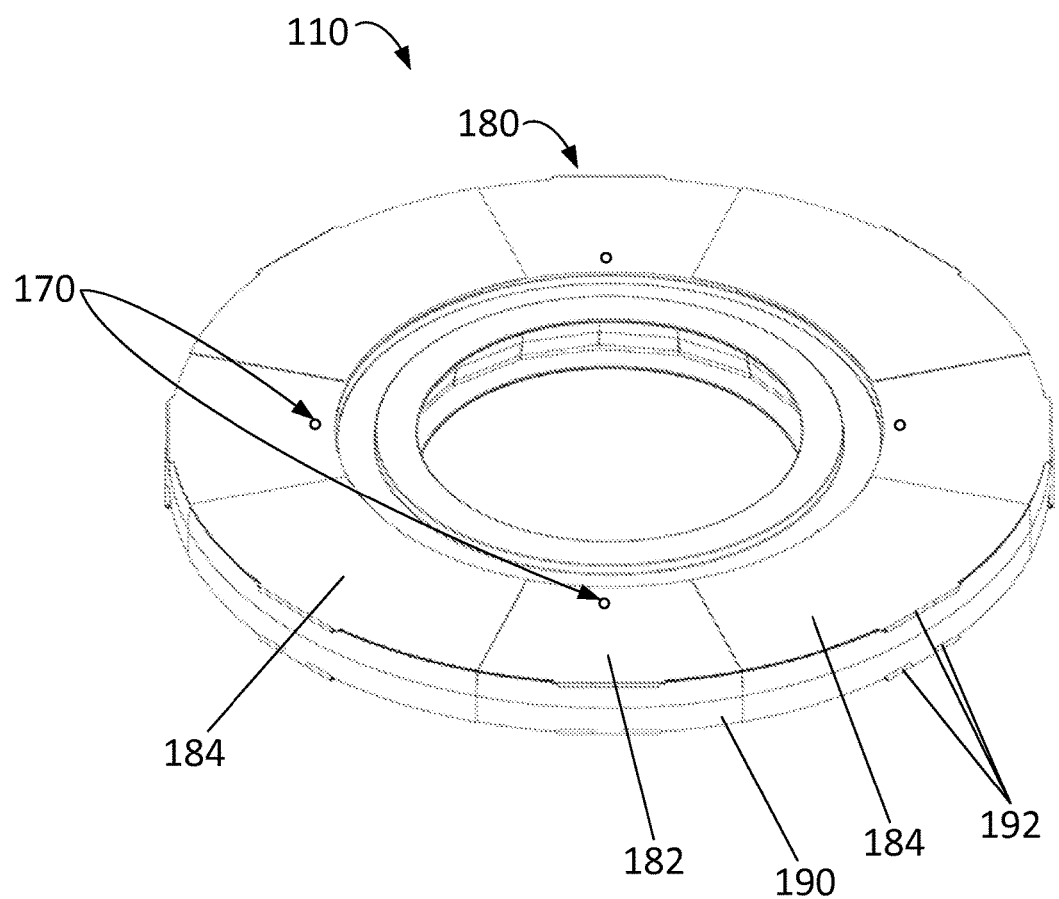
FIG. 10A is perspective view of another exemplary system for increasing the surface area of a spacecraft including a storage apparatus configured in a storage configuration.
Figure 10B:
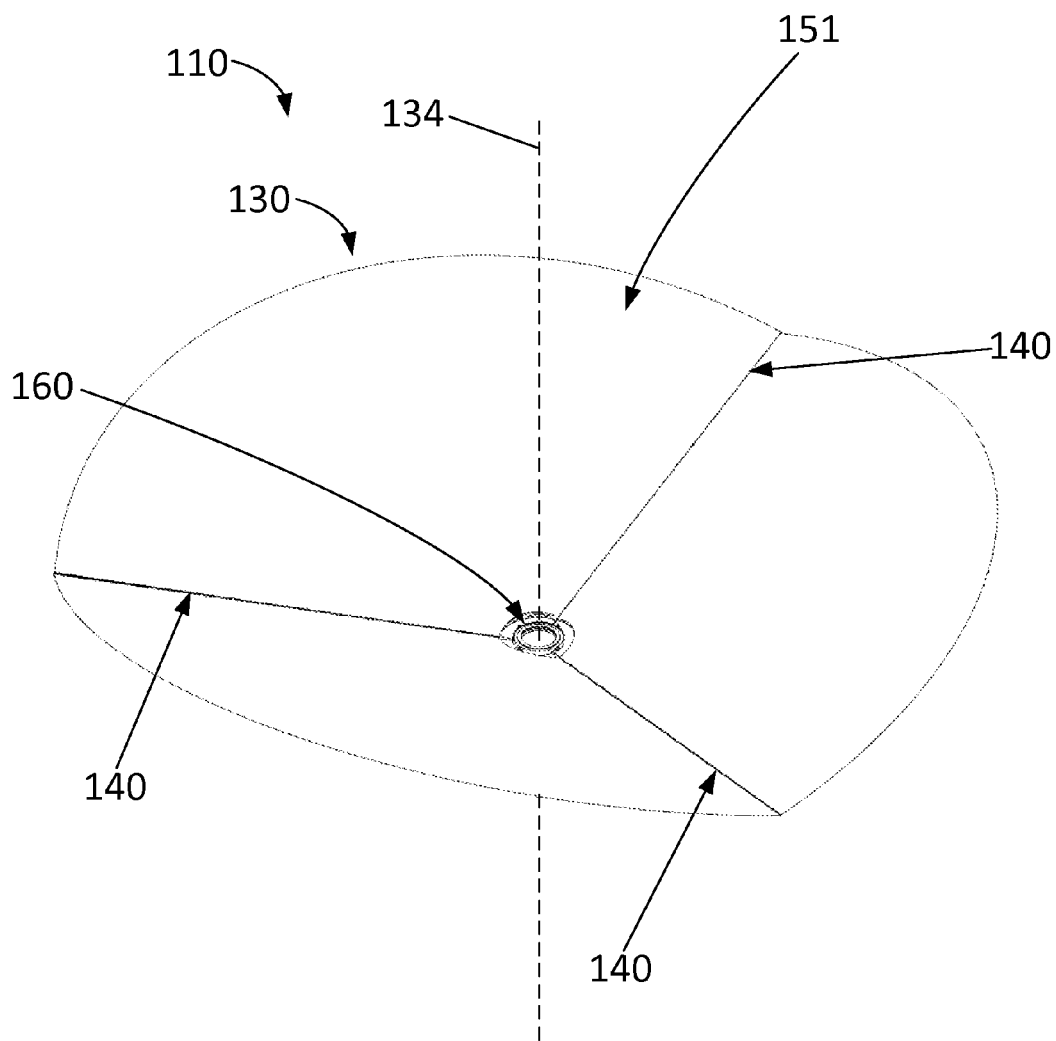
FIG. 10B is a perspective view of the exemplary system of FIG. 10A including the storage apparatus configured in a released configuration and a deployable gossamer apparatus configured in a deployed configuration.
Figure 10C:
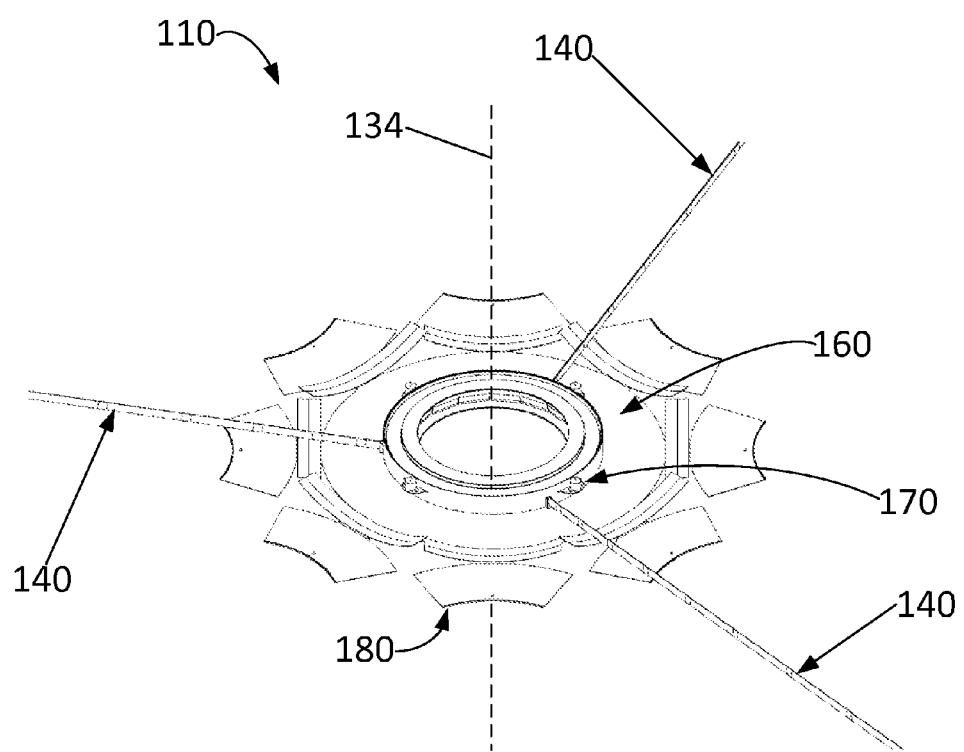
FIG. 10C is a perspective view of a central region of the exemplary system of FIG. 10B without the gossamer material.

Another exemplary system 110 for increasing the surface area of a spacecraft is depicted in FIGS. 10A-10C. Several features and/or portions of the exemplary system 110 may be similar to the exemplary system 10 described herein with reference to FIGS. 1-9. For example, the rib members 140, the gossamer material 151, the central mount portion 160, the actuation apparatus 170, portions of the storage apparatus 180 including hinges 192 and the subcomponents thereof, may be similar to the rib members 40, the gossamer material 51, the central mount portion 60, and the actuation apparatus 70, portions of the storage apparatus 80 including hinges 92, and the subcomponents thereof of the system of FIGS. 1-9. Further, for example, the storage and deployment mechanisms and systems and the deployment dynamics of the exemplary system 110 may be similar to the storage and deployment mechanisms and systems and the deployment dynamics of exemplary system 10. As such, such features and/or portions may not be further described herein or may not be described in the same level of detail, and it is to be understood that one or more such features and/or portions may be used interchangeably between each and every embodiment described herein.

As shown in FIGS. 10A-10C, the exemplary system 110 may include a central mount portion 160 that is ring-shaped (e.g., hollow in the middle, may be circular, but also may be a hollow triangle, square, hexagon etc.) about a central axis 134. The deployable gossamer apparatus 130 may fold and wrap around the central mount portion 160 when in the stowed configuration. The storage apparatus 180 may include four restraining wall portions 182 and four restrained wall portions 184. The system 110 may further include four actuation apparatuses 170 that correspond to the four restraining portions 182. When the actuation apparatuses 170 are actuated (e.g., released), the storage apparatus 180 may transition (e.g., unfolds) from the storage configuration as shown in FIG. 10A to the released configuration as shown in FIG. 2-10C to allow, or release, the deployable gossamer apparatus 130 to transition from the stowed configuration to the deployed configuration as shown in FIG. 10B-10C.

The central ring portion may be ring-shaped defining an opening such that the central portion 160 is couplable around a separation system of a spacecraft 20. The ring-shape of the central mount portion 160 may allow the system 110 to make efficient use of space on the spacecraft 20 by mounting around an already existing circular object such as a docking or launch vehicle interface ring (e.g., Lightband, Marman clamp, etc.).

The wall portions of the storage apparatus 180 may include a side wall portion 190, a top wall portions 182, 184, and hinges 192. When in the storage configuration as shown in FIG. 10A, the restraining wall portions 182 may overlap and restrain the restrained wall portions 184. The restraining, or overlap, feature may additionally be incorporated into one or more of the side wall portions 190, such as the side wall portions 90 that correspond to (e.g., are hinged to) the restraining wall portions 182. The use of an overlap configuration with restraining wall portions 182 and restrained top wall portions 184 may reduce the number of actuators needed by half as only the restraining portions 182 may need to be released for the storage apparatus 180 to transition from the storage configuration to the released configuration. In other ring-shaped embodiments, the storage apparatus may only include one restraining top wall portion and one or more restraining top wall portions.

The rib members 140 may be coupled to the central mount portion 160 in such a way as to allow them to rotate at least partially out of a storage plane when the deployable gossamer apparatus 130 is in a stowed configuration to an out-of-plane orientation in the deployed configuration as shown in FIG. 10B (e.g., a shuttlecock configuration or out-of-plane configuration).

Another exemplary system 210 for increasing the surface area of a spacecraft is depicted in FIGS. 11A-11H. Several features and/or portions of the exemplary system 210 may be similar to the exemplary systems 10, 110 described herein with reference to FIGS. 1-9 and FIGS. 10A-10C, respectively. For example, the rib members 240, the gossamer material 251, the central mount portion 260, the actuation apparatuses 270, portions of the storage apparatus 280, and the subcomponents thereof, may be similar to the rib members 40, 140, the gossamer material 51, 151, the central mount portions 60, 160, and the actuation apparatuses 70, 170, portions of the storage apparatus 80, 180, and the subcomponents thereof of the exemplary systems 10, 110. Further, for example, the storage and deployment mechanisms and systems and the deployment dynamics of exemplary system 210 may be similar to the storage and deployment mechanisms and systems and the deployment dynamics of exemplary systems 10 and 110. As such, such features and/or portions may not be further described herein or are not described in the same level of detail, and it is to be understood that one or more such features and/or portions may be used interchangeably between each and every embodiment described herein.

The exemplary system 210 of FIGS. 11A-11H may be configured to be mounted inside a docking ring 298 (e.g., a separation or connection system) of a spacecraft 20. The ability to mount the system 210 inside the docking ring 298 may provide an efficient use of space on the spacecraft 20 since, e.g., the area inside the docking ring 298 is an already existing and potentially unoccupied area on the spacecraft 20.

The exemplary system 210 may include a storage apparatus 280 including a plurality of wedge-shaped, or pie-slice-shaped, top wall portions 282, 284. As in previous embodiments described herein, one or more the top wall portions 282 may be configured to restrain the other top wall portions. For example, one of the top walls portions 282 may include a tab portion 272 that may interface with the actuation apparatus 270 and may restrain the remaining top wall portions.

As described, the top wall portions 282 of the storage apparatus 280 may be pie-shaped or triangular-shaped. The top wall portions 282 may be arranged such that the edges most distal from the central axis 234 are attached to side wall portions of the storage apparatus 280. In at least one embodiment, the exemplary system 210 may be integral, or built into, the spacecraft 20, and as such, the wall portions of the storage apparatus 280 may be directly coupled to the docking ring 298 (not shown). When the storage apparatus 280 is in the released configuration as shown FIGS. 11C-11E, the top wall portions 282 of the storage apparatus 280 may pivot away from a central mount portion 260 and/or actuation apparatus 270 to form a star-like geometry.

Figure 11A:
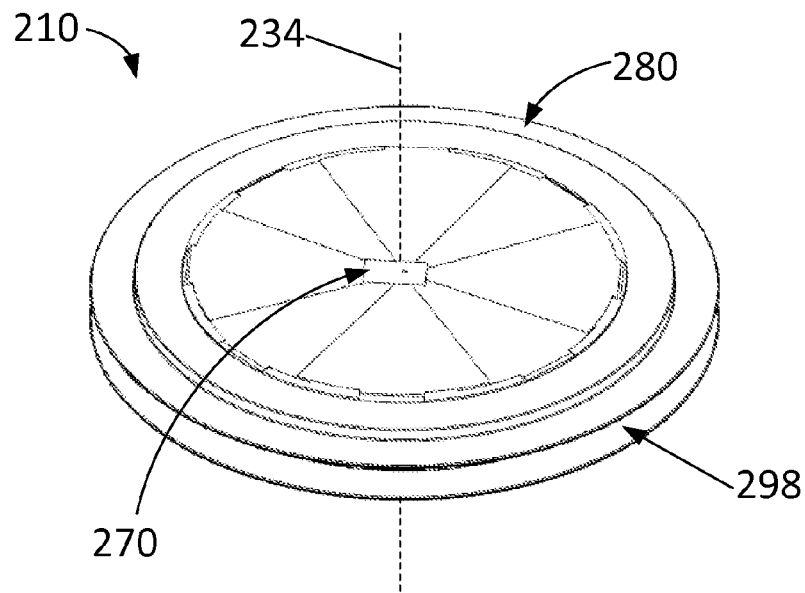
FIGS. 11A-11B are a perspective view and a top, plan view, respectively, of another exemplary system for increasing the surface area of a spacecraft including a storage apparatus in a storage configuration.
Figure 11B:
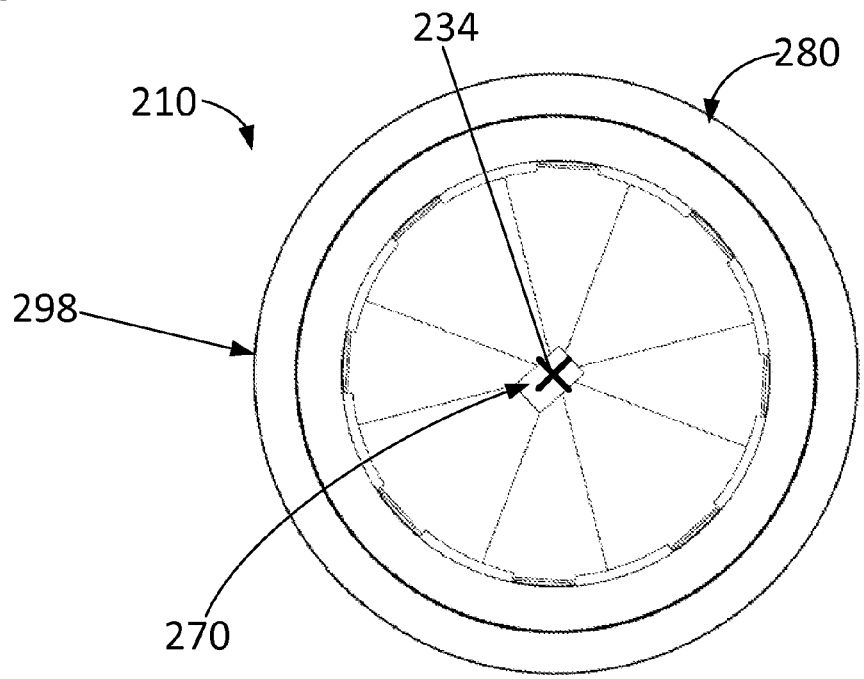
Figure 11C:
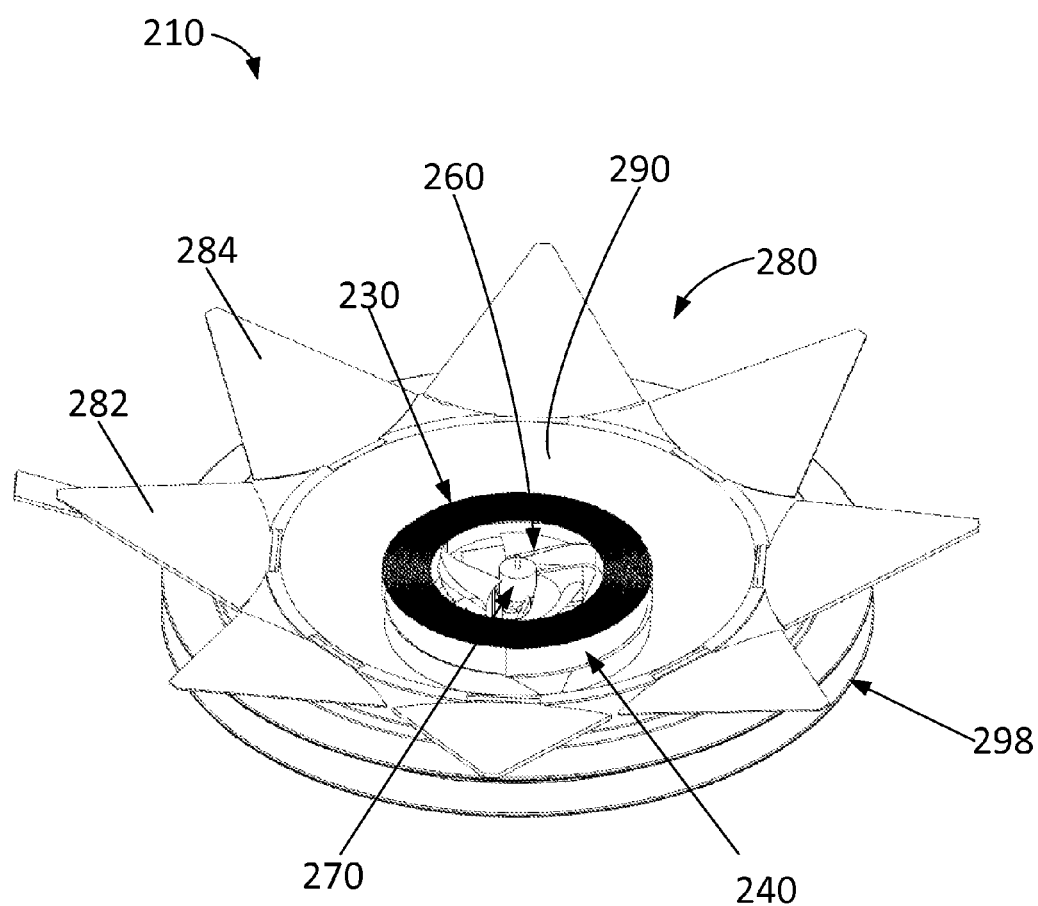
FIGS. 11C-11D are a perspective view and a top, plan view, respectively, of the exemplary system of FIGS. 11A-11B including the storage apparatus configured in a released configuration and a deployable gossamer apparatus configured in a stowed configuration.
Figure 11D:
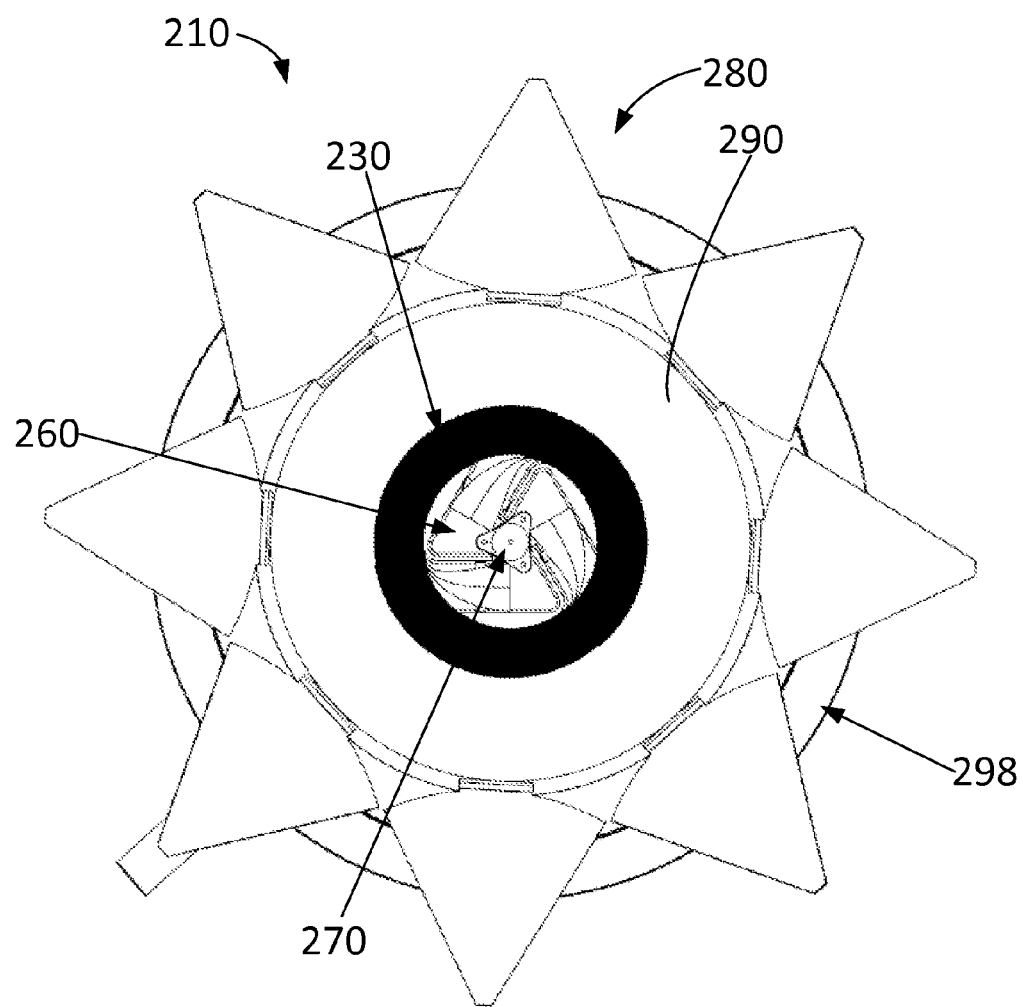

The storage apparatus 280 is depicted in the released configuration while the deployable gossamer apparatus 230 is shown in the stowed position in FIG. 11C for the purposes of clarity. As shown, the deployable gossamer apparatus 230 may include rib members 240 and gossamer material 251 that are wrapped around the central mount portion 260.

The central mount portion 260 may define an angle or curved surface 290 (e.g., the surface 290 may not be parallel to the storage plane, the surface 290 may be at an angle to the storage plane, etc.) configured to assist the transition of the deployable gossamer apparatus 230 from the stowed configuration to the deployed configuration of the deployable gossamer apparatus 230 when in the stowed configuration. More specifically, potential energy stored in the rib members 240, when released, may allow the rib members 240 to not only unwrap and extend radially outward (e.g., along a rib axis) but the rib members 240 may also react (e.g., abut, contact, engage, etc.) with the surface 290 causing the rib members 240 to move out of the storage plane. As shown in FIGS. 11E-11H, the rib members 240 may move out of the storage plane and into the out-of-plane or shuttlecock orientation with the rib members 240 lying along rib axes without the need for providing additional energy to the rib members for deployment. In other words, the stored potential energy provides all the energy necessary to deploy the deployable gossamer apparatus 230 from the stowed configuration to the deployed configuration.

Figure 12:
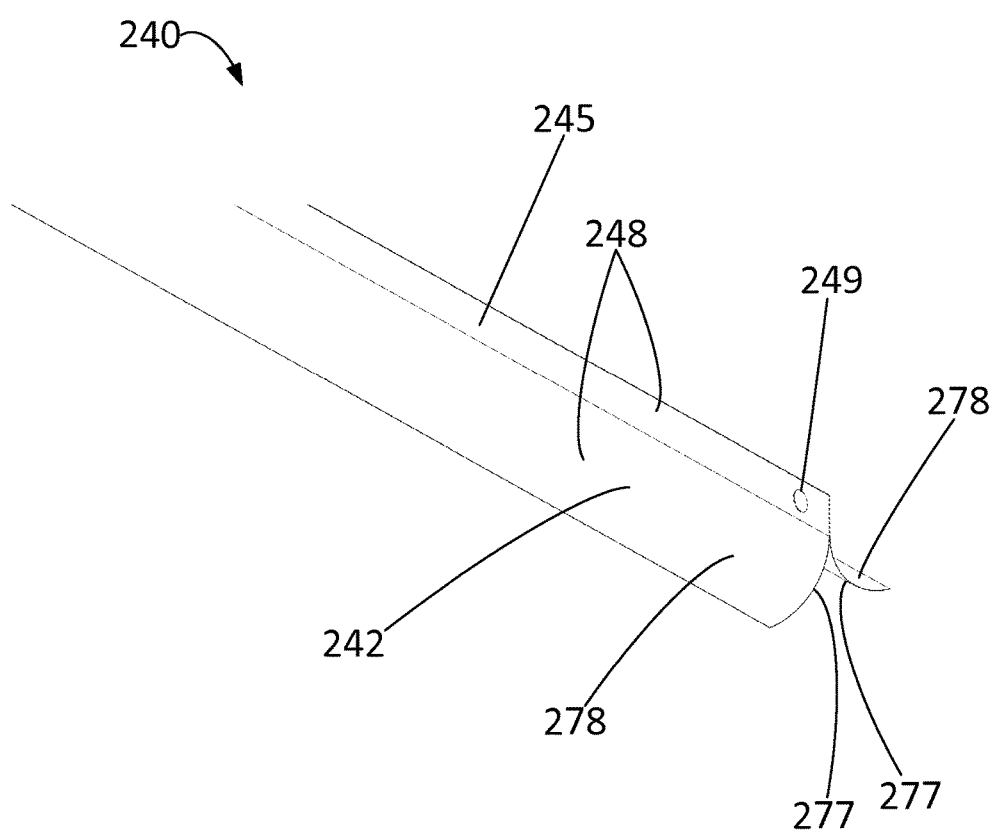
FIG. 12 is a close-up, perspective view of an end portion of a rib member of the exemplary deployable gossamer apparatus of FIGS. 11A-11H.

As shown in FIG. 12, the rib members 240 may be include (e.g. be formed of) one or more lenticular springs 248. In contrast to the rib members 40 described with reference to FIGS. 1-9, the two lenticular springs 248 of the rib members 240 may be configured, or oriented, such that the convex surfaces 277 face each other (e.g., an opposite configuration from the rib members 40 of FIGS. 1-9). Additionally, the concave surfaces 278 of each lenticular spring 248 may face away (e.g., in an opposing direction), at least in part, from each other. In at least one embodiment, the two lenticular springs 248 of each rib member 240 may further be connected along one edge 245. Further, the proximal end portion 242 of the rib member 240 may define an aperture 249 to be used to attach, or couple (e.g., rotatably or pivotably couple) the rib member 240 to the central portion portion 260. An exemplary rib member may be described in U.S. Pat. No. 7,895,795 to Murphey et al. entitled "TRIANGULAR ROLLABLE AND COLLAPSIBLE BOOM," which is incorporated herein by reference in its entirety.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. A system for increasing the surface area of a spacecraft comprising:
   a deployable gossamer apparatus comprising: a central mount portion,
   a plurality of rib members extending from a proximal end portion to a distal end portion,
   wherein the proximal end portion of each rib member of the plurality of rib members is rotatably coupled to the central mount portion about a coupling axis to provide rotation of each rib member about the coupling axis to extend outside of a storage plane to deploy the deployable gossamer apparatus,
   wherein each rib member of the plurality of rib members is biased to extend along a linear rib axis to deploy the deployable gossamer apparatus,
   wherein each rib member is configurable in at least a linear configuration and a nonlinear configuration,
   wherein each rib member extends along the linear rib axis when in the linear configuration,
   and wherein each rib member extends nonlinearly when in the nonlinear configuration,
   and gossamer material coupled to and extending between at least two of the plurality of rib members,
   wherein the deployable gossamer apparatus is configurable in at least a stowed configuration and a deployed configuration,
   wherein the plurality of rib members are wrapped around the central mount portion when in the stowed configuration,
   wherein the plurality of rib members are positioned to provide a surface area greater than the spacecraft when in the deployed configuration,
   wherein the central mount portion is stationary while the plurality of rib members are unwrapped from the central mount portion when transitioning from the stowed configured to the deployed configuration;
   and storage apparatus couplable to the spacecraft and configurable in a storage configuration and a released configuration, wherein the storage apparatus is configured to restrict deployment of the deployable gossamer apparatus from the stowed configuration to the deployed configuration when in the storage configuration, wherein the storage apparatus is configured to allow deployment of the deployable gossamer apparatus from the stowed configuration to the deployed configuration without providing energy to the deployable gossamer apparatus for deployment when in the released configuration wherein the storage apparatus comprises one or more wall portions to maintain the deployable gossamer apparatus in the stowed configuration wherein the plurality of rib members move the storage apparatus from the storage configuration to the deployed configuration when the plurality of rib members are transitioning from the stowed configuration to the deployed configuration.

2. The system of claim 1 further comprising an actuation apparatus configured to release the storage apparatus from the storage configuration so as to be configured in the deployed configuration.

3. The system of claim 2, wherein the actuation apparatus comprises a shape-memory actuator.

4. The system of claim 2, wherein the actuation apparatus is configured to release the storage apparatus from the storage configuration after a selected period of time has elapsed.

5. The system of claim 1, wherein the deployable gossamer apparatus and storage apparatus are configured to be couplable proximate a separation system of the spacecraft.

6. A deployable gossamer apparatus couplable to a spacecraft comprising:
a central mount portion;
a plurality of rib members extending from a proximal end portion to a distal end portion,
wherein the proximal end portion of each rib member of the plurality of rib members is coupled to the central mount portion,
wherein each rib member of the plurality of rib members is biased to extend along a linear rib axis,
wherein each rib member is configurable in at least a linear configuration and a nonlinear configuration,
wherein each rib member extends along the linear rib axis when in the linear configuration,
and wherein each rib member extends nonlinearly when in the nonlinear configuration;
and gossamer material coupled to and extending between at least two of the plurality of rib members,
wherein the deployable gossamer apparatus is configurable in at least a stowed configuration and a deployed configuration,
wherein the plurality of rib members are positioned to provide a surface area greater than the spacecraft when in the deployed configuration,
wherein, when in the stowed configuration, the plurality of rib members are wrapped around the central mount portion and store potential energy to provide movement of the deployable gossamer apparatus from the stowed configuration to the deployed configuration,
wherein the plurality of rib members extend radially from the central mount portion when the deployable gossamer apparatus is configured in the deployed configuration
wherein the gossamer material defines a gap in the gossamer material located between a first rib member and a second rib member of the plurality of rib members to allow the plurality of rib members to be wrapped around the central mount, portion when in the stowed configuration,
wherein the first, and second rib members are located in close proximity to each other when configured in the linear configuration,
wherein the rib axes of the first and second rib members are parallel to each other when the first and second rib members are configured in the linear configuration.

7. The apparatus of claim 6, wherein each rib member of the plurality rib members comprises at least one lenticular spring.

8. The apparatus of claim 6, wherein each rib member of the plurality rib members comprises two lenticular springs, wherein each of the two lenticular springs defines a concave surface and a convex surface opposite the concave surface.

9. The apparatus of claim 6, wherein the plurality of rib members comprises at least three rib members.

10. The apparatus of claim 6, wherein the deployable gossamer apparatus is further configured to be couplable proximate a separation system of the spacecraft.

11. A deployable gossamer apparatus couplable to a spacecraft comprising:
a central mount portion, wherein a central axis extends through the central mount portion;
a plurality of rib members extending from a proximal end portion to a distal end portion,
wherein the proximal end portion of each rib member of the plurality of rib members is rotatably coupled to the central mount portion about a coupling axis perpendicular to the central axis to provide rotation of each rib member about the coupling axis to extend outside of a storage plane to deploy the deployable gossamer apparatus,
wherein each rib member of the plurality of rib members is biased to extend along a linear rib axis,
wherein each rib member is configurable in at least a linear configuration and a nonlinear configuration,
wherein each rib member extends along the linear rib axis when in the linear configuration,
and wherein each rib member extends nonlinearly when in the nonlinear configuration;
and gossamer material coupled to and extending between at least two of the plurality of rib members,
wherein the deployable gossamer apparatus is configurable in at least a stowed configuration and a deployed configuration,
wherein the plurality of rib members are wrapped around the central mount portion and lie within the storage plane when in the stowed configuration,
wherein the storage plane is perpendicular to the central axis,
wherein the plurality of rib members are positioned to provide a surface area greater than the spacecraft and extends outside of the storage plane when in the deployed configuration,
wherein the plurality of rib members extend radially from the central mount portion when the deployable gossamer apparatus is configured in the deployed configuration
wherein the central mount portion comprises a plurality of rotation restriction bars
wherein the plurality of rotation restriction bars are positioned to contact the plurality of rib members to restrict an amount of rotation about the coupling axis that each rib member is rotatable to provide the movement of the plurality of rib members outside of the storage plane when in the deployed configuration.

12. The apparatus of claim 11, wherein the deployable gossamer apparatus, when in the deployed configuration, creates an offset between the center of pressure and center of gravity of the spacecraft to stabilize the spacecraft.

13. The apparatus of claim 11, wherein the rib axis of each of the plurality of rib members forms an acute angle with the central axis when in the deployed configuration.

14. The apparatus of claim 6, wherein the central mount portion is stationary while the plurality of rib members are unwrapped from the central mount portion when transitioning from the stowed configured to the deployed configuration.

15. The system of claim 1, wherein the gossamer material defines a gap in the gossamer material located between a first rib member and second rib member of the plurality of rib members to allow the plurality of rib members to be wrapped around the central mount portion when in the stowed configuration, wherein the first and second rib members are located in close proximity to each other when configured in the normal, linear configuration.

16. The apparatus of claim 11, wherein the gossamer material defines a gap in the gossamer material located between a first rib member and second rib member of the plurality of rib members to allow the plurality of rib members to be wrapped around the central mount portion when in the stowed configuration, wherein the first and second rib members are located in close proximity to each other when configured in the normal, linear configuration.

* * * * *